(12) United States Patent
Hasegawa et al.

(10) Patent No.: US 11,290,312 B2
(45) Date of Patent: Mar. 29, 2022

(54) TRANSMISSION APPARATUS THAT TRANSMITS A BLOCK SIGNAL

(71) Applicant: Mitsubishi Electric Corporation, Tokyo (JP)

(72) Inventors: Fumihiro Hasegawa, Tokyo (JP); Hiroshi Nishimoto, Tokyo (JP); Akihiro Okazaki, Tokyo (JP); Masatsugu Higashinaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/832,988

(22) Filed: Mar. 27, 2020

(65) Prior Publication Data

US 2020/0228378 A1 Jul. 16, 2020

Related U.S. Application Data

(62) Division of application No. 15/885,965, filed on Feb. 1, 2018, now Pat. No. 10,644,920, which is a division
(Continued)

(30) Foreign Application Priority Data

Mar. 13, 2013 (JP) .................................. 2013-050930

(51) Int. Cl.
*H04W 4/00* (2018.01)
*H04L 27/26* (2006.01)
(Continued)

(52) U.S. Cl.
CPC .... *H04L 27/2636* (2013.01); *H04L 25/03828* (2013.01); *H04L 27/2602* (2013.01); *H04L 27/362* (2013.01)

(58) Field of Classification Search
CPC .................................................. H04L 27/2636
See application file for complete search history.

(56) References Cited

U.S. PATENT DOCUMENTS

| | | | |
|---|---|---|---|
| 5,920,598 | A | 7/1999 | Hyakuda et al. |
| 6,088,324 | A | 7/2000 | Sato |

(Continued)

FOREIGN PATENT DOCUMENTS

| | | |
|---|---|---|
| CN | 101087290 A | 12/2007 |
| CN | 101282465 A | 9/2008 |

(Continued)

OTHER PUBLICATIONS

Extended European Search Report dated Dec. 4, 2020 in European Patent Application No. 20204540.7, 9 pages.
(Continued)

*Primary Examiner* — Guang W Li
(74) *Attorney, Agent, or Firm* — Oblon, McClelland, Maier & Neustadt, L.L.P.

(57) ABSTRACT

A transmission apparatus that transmits a block signal including a plurality of data symbols, includes: a data-symbol generation unit that generates a data symbol; a symbol arrangement unit that arranges the data symbol and a same-quadrant symbol such that one same-quadrant symbol that becomes a signal point in a same quadrant in a complex plane is inserted per block at a predetermined position in each block signal to generate a block symbol; a CP insertion unit that inserts a Cyclic Prefix into the block symbol; and an interpolation unit that performs interpolation processing on the block symbol on which CP insertion has been performed.

2 Claims, 22 Drawing Sheets

Related U.S. Application Data of application No. 14/773,975, filed as application No. PCT/JP2014/056211 on Mar. 10, 2014, now Pat. No. 9,917,716.

(51) Int. Cl.
*H04L 27/36* (2006.01)
*H04L 25/03* (2006.01)

(56) References Cited

U.S. PATENT DOCUMENTS

| | | | |
|---|---|---|---|
| 6,625,111 | B1 | 9/2003 | Sudo |
| 7,558,190 | B2* | 7/2009 | Sudo ............... H04L 27/265 370/208 |
| 7,715,492 | B2* | 5/2010 | Seki ............... H04L 27/2636 375/295 |
| 7,778,337 | B2* | 8/2010 | Tong ............... H04L 25/0244 375/260 |
| 8,213,538 | B2* | 7/2012 | Richardson ......... H04L 25/0202 375/299 |
| 8,331,468 | B2* | 12/2012 | Escolar-Piedras ......................... H04L 27/2636 375/260 |
| 8,542,770 | B2 | 9/2013 | Nakao |
| 8,669,536 | B2 | 3/2014 | Ma |
| 8,718,099 | B2 | 5/2014 | Otsuka et al. |
| 8,923,339 | B2 | 12/2014 | Strumpf |
| 9,071,391 | B2 | 6/2015 | Noh |
| 9,226,232 | B2 | 12/2015 | Kwan |
| 9,608,780 | B2* | 3/2017 | Luo ............... H04L 5/0023 |
| 10,038,507 | B2 | 7/2018 | Yoshida |
| 2004/0220986 | A1 | 11/2004 | Pisoni |
| 2005/0185722 | A1 | 8/2005 | Abe et al. |
| 2005/0232374 | A1 | 10/2005 | Mantyla |
| 2007/0140106 | A1* | 6/2007 | Tsai ............... H04B 7/2681 370/208 |
| 2007/0280365 | A1 | 12/2007 | Seki |
| 2007/0286310 | A1 | 12/2007 | Fukuoka |
| 2008/0170635 | A1 | 7/2008 | Ochi et al. |
| 2008/0222462 | A1 | 9/2008 | Ban |
| 2008/0222482 | A1* | 9/2008 | Ban ............... H04L 27/2607 714/752 |
| 2009/0003488 | A1* | 1/2009 | Ban ............... H04L 27/2071 375/308 |
| 2009/0238290 | A1* | 9/2009 | Imai ............... H04L 25/0204 375/260 |
| 2010/0034311 | A1* | 2/2010 | Hasegawa ............ H04L 5/0007 375/267 |
| 2010/0039927 | A1 | 2/2010 | Noh |
| 2010/0046648 | A1 | 2/2010 | Nerella |
| 2010/0061224 | A1 | 3/2010 | Noh |
| 2010/0135433 | A1* | 6/2010 | Maeda ............... H04L 27/2602 375/295 |
| 2010/0142364 | A1 | 6/2010 | Sahlman |
| 2010/0150069 | A1 | 6/2010 | Fang |
| 2011/0150128 | A1 | 6/2011 | Yamazaki |
| 2012/0045014 | A1* | 2/2012 | Damnjanovic ......... H04L 5/001 375/295 |
| 2012/0195328 | A1 | 8/2012 | Otsuka et al. |
| 2012/0307743 | A1* | 12/2012 | McGowan ............ H04L 27/265 370/329 |
| 2013/0114659 | A1 | 5/2013 | Murakami |
| 2013/0142177 | A1 | 6/2013 | Nentwig |
| 2014/0247872 | A1 | 9/2014 | Merkle |
| 2016/0013963 | A1* | 1/2016 | Hasegawa ......... H04L 27/26265 375/295 |
| 2016/0192385 | A1* | 6/2016 | Tooher ............... H04L 27/2611 370/336 |
| 2016/0277936 | A1 | 9/2016 | Hasegawa |
| 2016/0277938 | A1 | 9/2016 | Hasegawa |

FOREIGN PATENT DOCUMENTS

| | | |
|---|---|---|
| CN | 101297512 A | 10/2008 |
| EP | 2 966 795 A1 | 1/2016 |
| JP | 10-308713 | 11/1998 |
| JP | 2000-269919 | 9/2000 |
| JP | 2004-201286 | 7/2004 |
| JP | 2008-136055 | 6/2008 |
| JP | 2008-177693 | 7/2008 |
| JP | 2008-244664 A | 10/2008 |
| JP | 2012-156926 A | 8/2012 |
| JP | 2012-209703 | 10/2012 |
| JP | 2013-201549 | 10/2013 |
| WO | WO 2010-055639 | 5/2010 |

OTHER PUBLICATIONS

Chinese Office Action issued in Chinese Patent Application No. 201480013375.X dated May 27, 2017 (w/ English translation).
Office Action issued in co-pending U.S. Appl. No. 14/909,928 dated Sep. 16, 2016.
Office Action issued in co-pending U.S. Appl. No. 14/909,928 dated Jan. 31, 2017.
Office Action issued in co-pending U.S. Appl. No. 15/466,189 dated Jun. 2, 2017.
Extended European Search Report issued in Patent Application No. 14762995.0 dated Oct. 20, 2016.
Hasegawa et al., "A Novel Out-Of-Band Power Suppression Method for SC-OFDM", IEICE, (Mar. 19-22, 2013).
Hasegawa et al., "A Novel Out-Of-Band Spectrum Suppression Method without Data Loss", IEICE, vol. 113, No. 184, (Aug. 22, 2013), pp. 57-62, with English abstract.
Benvenuto et al., "Single Carrier Modulation With Nonlinear Frequency Domain Equalization: An Idea Whose Time Has Come—Again", Proceedings of the IEEE, vol. 98, No. 1, (Jan. 2010), pp. 69-96.
Bingham, "Multicarrier Modulation for Data Transmission: An Idea Whose Time Has Come", IEEE Communications Magazine, vol. 28, No. 5, (May 1990), Total 8 Pages.
Porat, "A Course in Digital Signal Processing", John Wiley and Sons Inc., (Oct. 1996), pp. 106-107.
Rappaport, "Wireless Communications: Principles and Practice (2nd Edition)", Prentice Hall, (Dec. 2001), pp. 288-289.
Chung, "Spectrally Precoded OFDM", IEEE Transactions on Communications, vol. 54, No. 12, (Dec. 2006), pp. 2173-2185.
Faulkner, "The Effect of Filtering on the Performance of OFDM Systems", IEEE Transactions on Vehicular Technology, vol. 49, No. 5, (Sep. 2000), pp. 1877-1884.
Tan et al., "Frequency-Domain Equalization for Continuous Phase Modulation", IEEE Transaction on Wireless Communications, vol. 4, No. 5, (Sep. 2005), pp. 2479-2490.
Beek et al., "N-continuous OFDM", IEEE Communications Letters, vol. 13, No. 1, (Jan. 2009), pp. 1-3.
International Search Report issued in PCT/JP14/56211 dated Apr. 8, 2014.
Japanese Office Action dated Mar. 12, 2019 in Japanese Patent Application No. 2018-030679 (with unedited computer generated English translation), 6 pages.
Office Action dated Aug. 6, 2018 in European Patent Application No. 14834934.3.
Office Action dated Dec. 22, 2017 in European Patent Application No. 14762995.0 (6 pgs.).
Office Action dated Dec. 22, 2017 in European Patent Application No. 14834934.3.
Office Action dated Jan. 16, 2020 in European Patent Application No. 19 151 264.7-1220.
Extended European Search Report dated Apr. 2, 2019 in the European Patent Application No. 19151284.7.
Japanese Office Action dated Aug. 6, 2019 in Patent Application No. 2018-030679, 7 pages (w/unedited computer generated English translation).

* cited by examiner

FIG.22

|  | k-1TH BLOCK | kTH BLOCK | k+1TH BLOCK |  |
|---|---|---|---|---|
| ... | | | | ... |
| $-N_{CP}+1$ | 010010 | 010110 | 011111 |  |
| $-N_{CP}+2$ | 001010 | 000110 | 101011 |  |
| ⋮ | ⋮ | ⋮ | ⋮ |  |
| -1 | 101010 | 000111 | 101010 |  |
| 0 | 111011 | 000100 | 011011 |  |
| 1 | 010100 | 101010 | 010100 |  |
| 2 | 101111 | 110100 | 011111 |  |
| 3 | 101100 | 010011 | 101100 | COPY |
| 4 | 010000 | 000110 | 010000 |  |
| 5 | 000010 | 001010 | 000010 |  |
| 6 | 000000 | 110001 | 000000 |  |
| ⋮ | ⋮ | ⋮ | ⋮ | ... |
| $N-N_{CP}+1$ | 010010 | 010110 | 011111 |  |
| $N-N_{CP}+2$ | 001010 | 000110 | 101011 |  |
| ⋮ | ⋮ | ⋮ | ⋮ |  |
| N-1 | 101010 | 000111 | 101010 |  |
| N | 111011 | 000100 | 011011 |  |

HIGH-ORDER TWO BITS ARE FIXED TO "01"

FIG.23

| | | k-1TH BLOCK | kTH BLOCK | k+1TH BLOCK | |
|---|---|---|---|---|---|
| | $-N_{CP}+1$ | 010010 | 010000 | 010011 | |
| | $-N_{CP}+2$ | 001010 | 000110 | 101011 | |
| | ⋮ | ⋮ | ⋮ | ⋮ | |
| | -1 | 101010 | 000111 | 101010 | |
| | 0 | 111011 | 000100 | 011011 | |
| | 1 | 010100 | 101010 | 010100 | |
| | 2 | 101111 | 110100 | 011111 | |
| | 3 | 101100 | 010011 | 101100 | |
| | 4 | 010000 | 000110 | 010000 | COPY |
| | 5 | 000010 | 001010 | 000010 | |
| HIGH-ORDER FOUR BITS ARE FIXED TO "0100" | 6 | 000000 | 110001 | 000000 | |
| | ⋮ | ⋮ | ⋮ | ⋮ | |
| | $N-N_{CP}+1$ | 010010 | 010000 | 010011 | |
| | $N-N_{CP}+2$ | 001010 | 000110 | 101011 | |
| | ⋮ | ⋮ | ⋮ | ⋮ | |
| | N-1 | 101010 | 000111 | 101010 | |
| | N | 111011 | 000100 | 011011 | |

TRANSMISSION APPARATUS THAT TRANSMITS A BLOCK SIGNAL

CROSS-REFERENCE TO RELATED APPLICATIONS

This application is a divisional application of, and claims the benefit of priority under U.S.C § 120 from U.S. application Ser. No. 15/885,965, filed Feb. 1, 2018, herein incorporated by reference, which is a divisional application of U.S. Pat. No. 9,917,716, issued Mar. 3, 2018, the entire contents of which is incorporated herein by reference, which is a 371 of International Application No. PCT/JP14/056211 filed Mar. 10, 2014 and claims the benefit of priority from prior Japanese Application No. 2013-050930 filed Mar. 13, 2013.

FIELD

The present invention relates to a transmission apparatus, a reception apparatus, and a communication system.

BACKGROUND

In a digital communication system, frequency selectivity and time variability in a transmission line arise because of multipath phasing caused by a transmission signal being reflected by buildings or the like or Doppler variation caused by the terminal moving. In such a multipath environment, a received signal becomes a signal in which a transmission symbol and a symbol arriving after a delay time interfere with each other.

With this kind of transmission line having frequency selectivity, a single carrier block transmission method has recently attracted attention in order to acquire the best receiving characteristics (see, for example, Non Patent Literature 1 listed below). The single carrier (SC) block transmission system can reduce the peak power compared with an OFDM (Orthogonal Frequency Division Multiplexing) transmission method, which is multi-carrier (Multiple Carrier: MC) block transmission (see, for example, Non Patent Literature 2 listed below).

With a transmitter that performs SC block transmission, measures against multipath phasing are taken by performing, for example, the following kinds of transmission. First, after generating a PSK (Phase Shift Keying) signal or a QAM (Quadrature Amplitude Modulation) signal, which are digital modulation signals, in a "Modulator", the digital modulation signal is converted to a time domain signal by a precoder and an IDFT (Inverse Discrete Fourier Transform) processing unit. Thereafter, as a measure against multipath phasing, a CP (Cyclic Prefix) is inserted by a CP insertion unit. The CP insertion unit copies a predetermined number of samples behind the time domain signal and adds the samples to the head of a transmission signal. In addition to this method, as a measure against multipath phasing, ZP (Zero Padding: zero insertion) is performed by inserting zero into a start portion and an end portion of data.

Furthermore, in order to suppress transmission peak power, in a transmitter that performs SC transmission, a precoder normally performs DFT (Discrete Fourier Transform) processing.

CITATION LIST

Non Patent Literatures

Non Patent Literature 1: N. Benvenuto, R. Dinis, D. Falconer and S. Tomasin, "Single Carrier Modulation With Nonlinear Frequency Domain Equalization: An Idea Whose Time Has Come-Again", Proceeding of the IEEE, vol. 98, no. 1, January 2010, pp. 69-96.

Non Patent Literature 2: J. A. C. Bingham, "Multicarrier Modulation for Data Transmission: An idea Whose Time Has Come", IEEE Commun. Mag., vol. 28, no. 5, May 1990, pp. 5-14.

SUMMARY

Technical Problem

According to the conventional SC block transmission technique described above, transmission peak power is suppressed while the effect of multipath phasing is reduced. However, with the SC block transmission, the phase and the amplitude become discontinuous between the SC blocks, and thus there is a problem that out-of-band spectrum or out-of-band leakage occurs. Because the out-of-band spectrum interferes with an adjacent channel, the out-of-band spectrum needs to be suppressed. Further, in a general communication system, a spectral mask is defined, and the out-of-band spectrum needs to be suppressed so as to satisfy the mask.

The present invention has been achieved in view of the above problems, and an object of the present invention is to provide a transmission apparatus, a reception apparatus, and a communication system that can suppress an out-of-band spectrum.

Solution to Problem

In order to solve the above problems and achieve the object, an aspect of the present invention is a transmission apparatus that transmits a block signal including a plurality of data symbols, the transmission apparatus including: a data-symbol generation unit that generates a data symbol; a symbol arrangement unit that arranges the data symbol and a same-quadrant symbol such that one same-quadrant symbol that becomes a signal point in a same quadrant in a complex plane is inserted per block at a predetermined position in each block signal to generate a block symbol; a CP insertion unit that inserts a Cyclic Prefix into the block symbol; and an interpolation unit that performs interpolation processing on the block symbol on which CP insertion has been performed.

Advantageous Effects of Invention

According to the present invention, an effect is obtained where an out-of-band spectrum can be suppressed.

BRIEF DESCRIPTION OF DRAWINGS

FIG. 22 is a diagram illustrating an example of a block symbol when 64 QAM is used.

FIG. 23 is a diagram illustrating an example of a block symbol when 64QAM is used.

DESCRIPTION OF EMBODIMENTS

Exemplary embodiments of a transmission apparatus, a reception apparatus, and a communication system according to the present invention will be explained below in detail with reference to the accompanying drawings. The present invention is not limited to the embodiments.

First Embodiment

Figure 1:
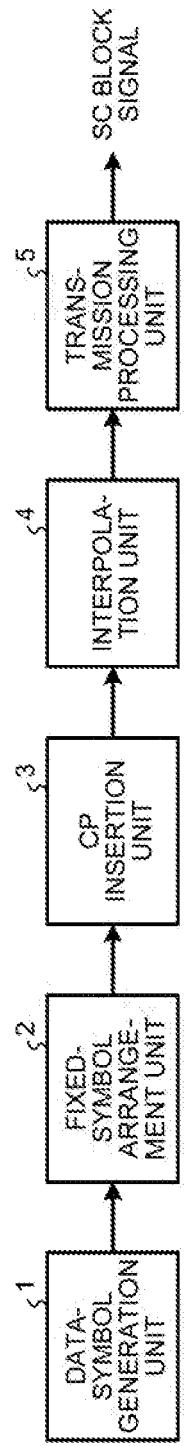
FIG. 1 is a diagram illustrating a functional configuration example of a transmission apparatus according to a first embodiment.

FIG. 1 is a diagram illustrating a functional configuration example of a transmission apparatus according to a first embodiment of the present invention. As illustrated in FIG. 1, the transmission apparatus according to the present invention includes a data-symbol generation unit 1, a fixed-symbol arrangement unit (symbol arrangement unit) 2, a insertion unit 3, an interpolation unit 4, and a transmission processing unit 5.

The data-symbol generation unit 1 generates a data symbol (for example, a PSK (Phase Shift Keying) symbol and a QAM (Quadrature Amplitude Modulation) symbol). The fixed-symbol arrangement unit 2 arranges one preassigned fixed symbol (fixed signal) at a predetermined position with respect to a data symbol to generate a block symbol. The CP insertion unit 3 inserts a CP into the block symbol generated by the fixed-symbol arrangement unit 2. The interpolation unit 4 performs interpolation processing on the block symbol after the CP has been inserted. The transmission processing unit 5 performs transmission filtering processing, analog-signal conversion processing, and the like on the block symbol after the interpolation processing, and transmits the block symbol as an SC block signal (block signal).

Figure 2:
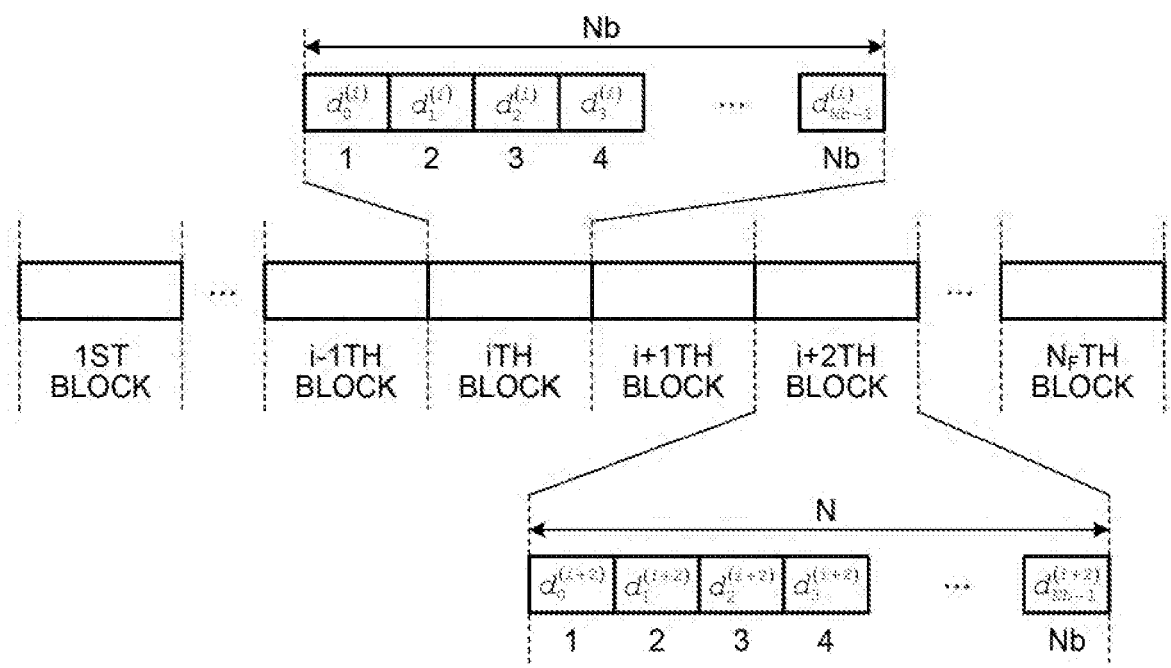
FIG. 2 is a diagram illustrating an example of the frame configuration used in a communication system that performs SC block transmission.
Figure 3:
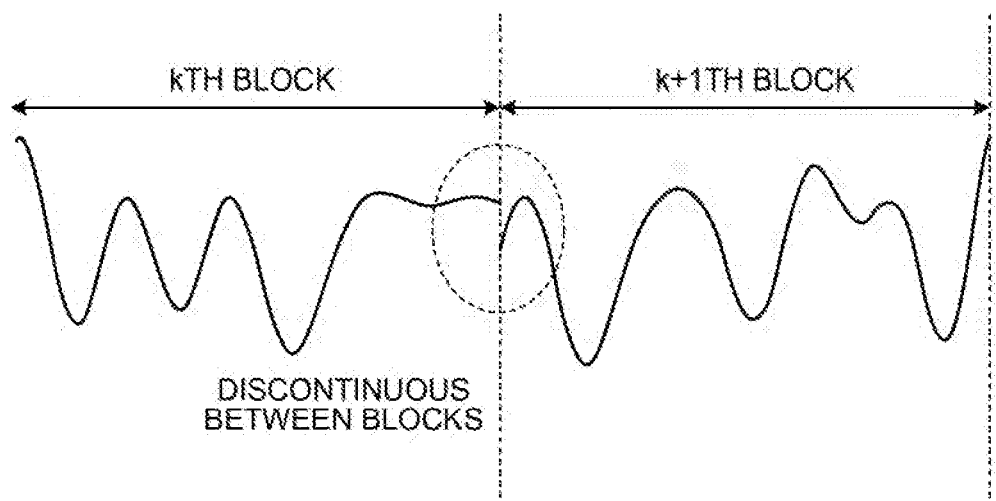
FIG. 3 is a diagram illustrating an example in which a phase and an amplitude become discontinuous between SC blocks in conventional SC block transmission.

Conventional SC block transmission is described here. In the SC block transmission, the phase and the amplitude become discontinuous between SC blocks. FIG. 2 is a diagram illustrating an example of the frame configuration used in a communication system that performs SC block transmission. In FIG. 2, $d_k^{(n)}$ denotes the k-th symbol of the n-th block. FIG. 2 illustrates an example in which the SC block consists of $N_b$ symbols and one frame consists of $N_F$ SC blocks. FIG. 3 is a diagram illustrating an example in which the phase and the amplitude become discontinuous between SC blocks in the conventional SC block transmission. In the example in FIG. 3, the out-of-band spectrum or the out-of-band leakage occurs between the k-th block and the (k+1)th block. Such an out-of-band spectrum interferes with an adjacent channel. In the present embodiment, the out-of-band spectrum is reduced by inserting a fixed symbol between data symbols and performing CP insertion after inserting the fixed symbol.

An operation according to the present embodiment is described next. It is assumed that the number of symbols (the total number of data symbols and fixed symbols) before CP insertion into one single-carrier block (SC block) is N.

The fixed-symbol arrangement unit 2 arranges one pre-assigned fixed symbol "A" at a predetermined position with respect to a data symbol. The fixed symbol can be any symbol as long as rules and regulations of the communication system to be applied are satisfied, and a symbol, such as a PSK symbol and a QAM symbol, can be used.

Figure 4:
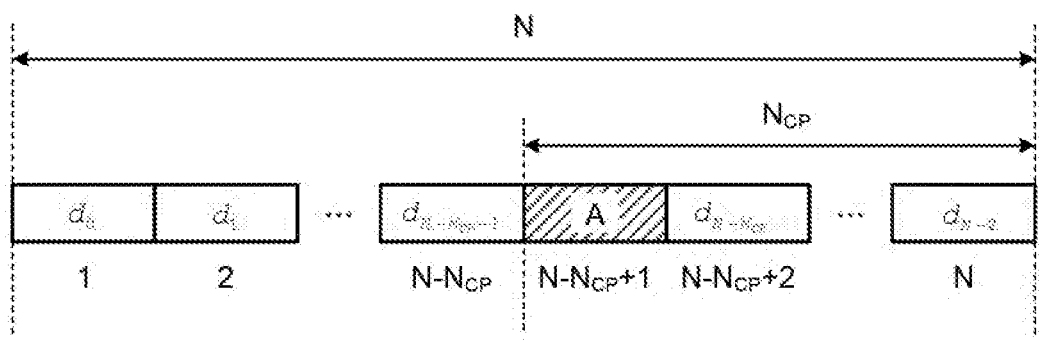
FIG. 4 is a diagram illustrating an example of fixed symbol arrangement according to the first embodiment.

FIG. 4 is a diagram illustrating an example of fixed symbol arrangement according to the present embodiment. In the example of FIG. 4, the fixed symbol "A" is inserted at the $(N-N_{CP}+1)$th position in the block symbol (a symbol group constituting one block). In FIG. 4, $d_k$ denotes the k-th data symbol of data symbols in one block.

Figure 5:
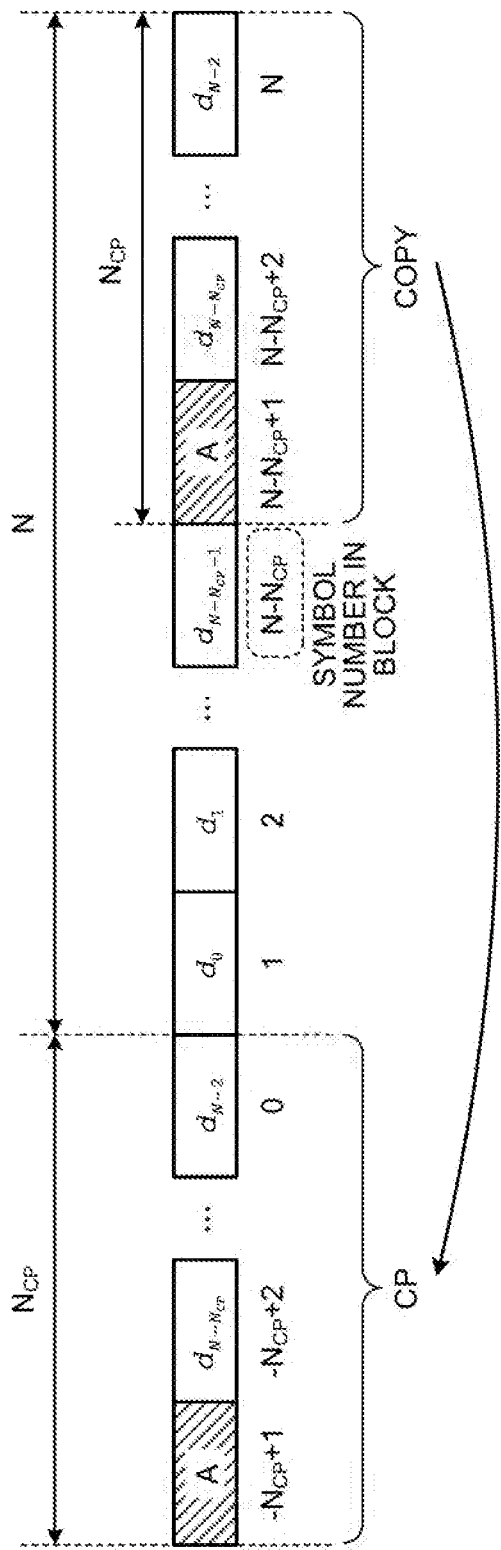
FIG. 5 is a diagram illustrating an example of a block symbol after CP insertion.
Figure 6:
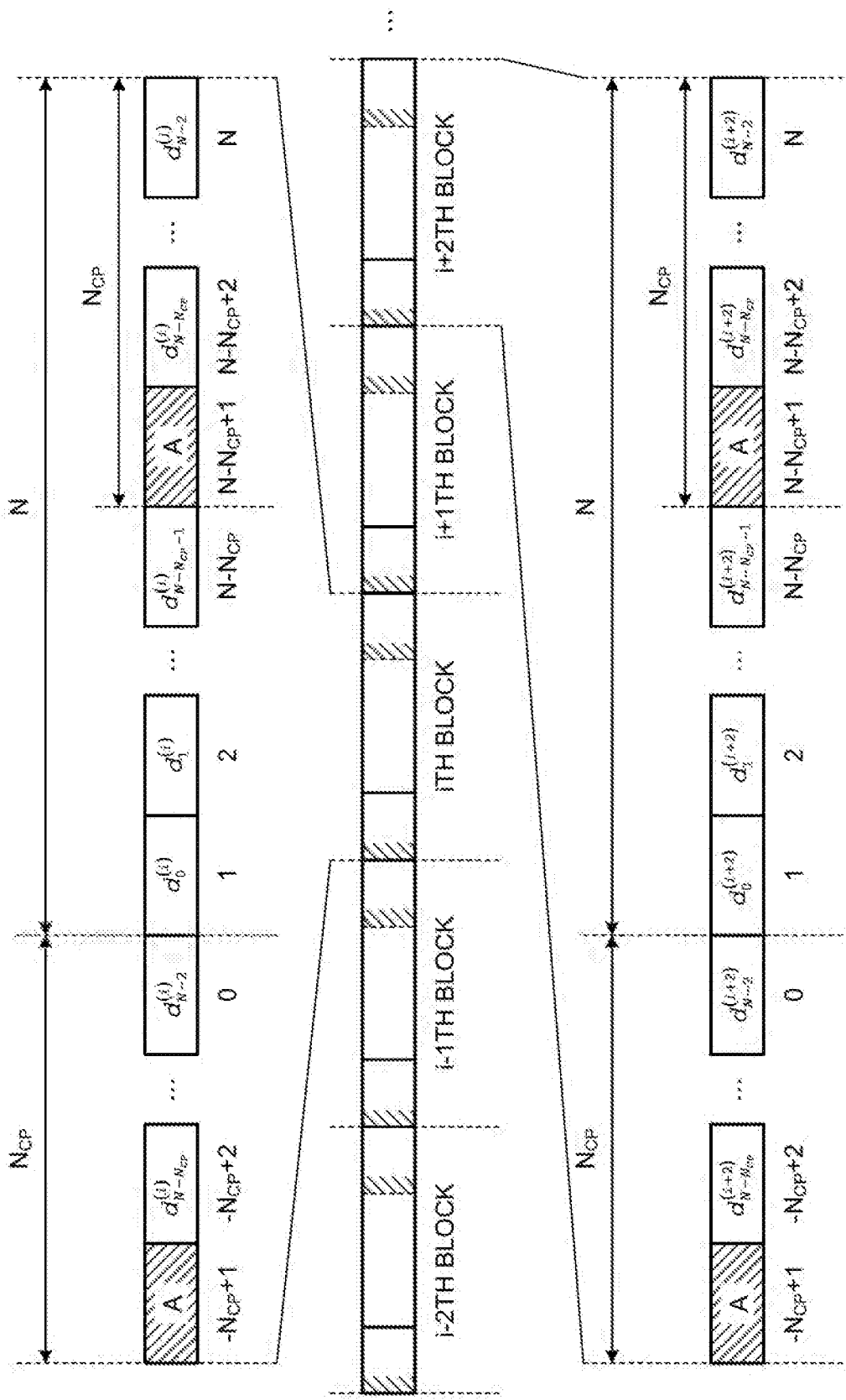
FIG. 6 is a diagram illustrating an example of the frame configuration of the first embodiment.

FIG. 5 is a diagram illustrating an example of the block symbol after CP insertion. As illustrated in FIG. 5, the CP insertion unit 3 copies (duplicates) the last $N_{CP}$ symbols in the block symbol after the fixed symbol has been inserted and adds the symbols to the head of the block symbol, as CP insertion processing. FIG. 6 is a diagram illustrating an example of the frame configuration of the present embodiment. As illustrated in FIG. 6, the fixed symbol is inserted at the same position (the $(N-N_{CP}+1)$th position) in each block in the frame. In this manner, if the $((N-N_{CP}+1)$th) symbol at the head of the region to be copied by the CP insertion unit is designated as a fixed symbol, the symbol at the head of the block becomes a fixed symbol after CP insertion. In the case of $N_{CP}=0$, $d_0$ (the first symbol in the block) in FIG. 5 is set as a fixed symbol.

Figure 7:
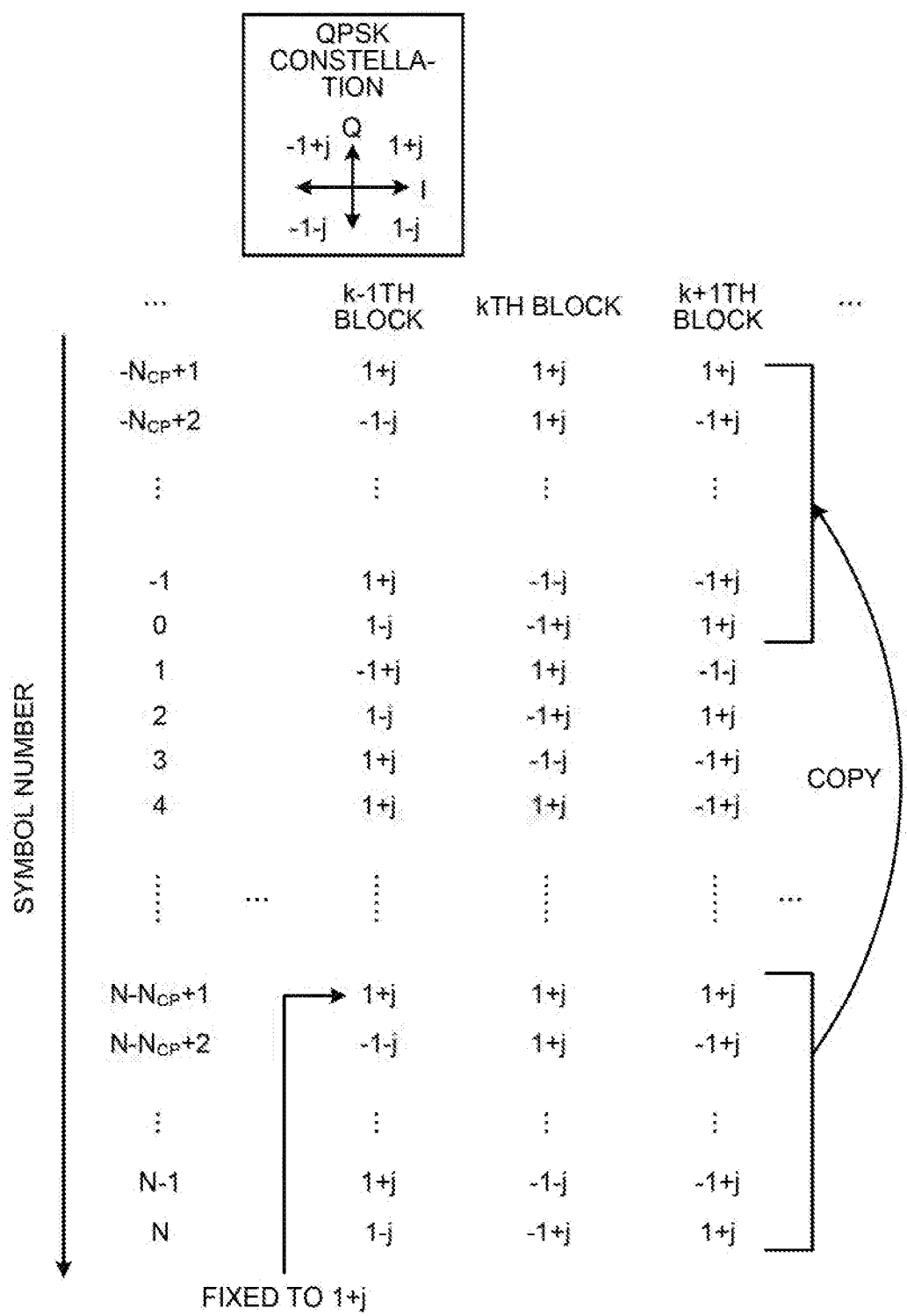
FIG. 7 is a diagram illustrating an example of a fixed symbol when a QPSK symbol is used as a data symbol.

FIG. 7 is a diagram illustrating an example of the fixed symbol when a QPSK symbol is used as a data symbol. A data symbol is assigned to any point of the four points illustrated as a QPSK constellation in FIG. 7 according to the information to be transmitted. As illustrated in FIG. 7, the first symbol and the (N−$N_{CP}$+1)th symbol become the fixed symbols and are fixed to 1+j. FIG. 7 is only an example, and the fixed symbol is not limited to the QPSK symbol and the fixed symbol value is not limited to 1+j. In the case of $N_{CP}$=0, the CP insertion unit 3 does not perform copying.

The interpolation unit 4 performs oversampling (processing to increase the sampling rate, that is, to reduce the sampling interval) by using a signal interpolation formula described, for example, in "B. Porat, "A Course in Digital Signal Processing", John Wiley and Sons Inc., 1997" (hereinafter, "Porat Literature"). Oversampling is performed such that sampling points per symbol becomes L with respect to the time domain signal input to the interpolation unit 4. That is, oversampling is performed such that the sampling rate becomes L times with respect to the input. The oversampling rate is a value indicating how many times the sampling rate after oversampling is larger than the input sampling rate.

Specifically, for example, the interpolation unit 4 converts the input time domain signal to a frequency domain signal, performs zero insertion processing for inserting zero with respect to the frequency domain signal, and converts the frequency domain signal to the time domain signal again. In this manner, oversampling can be performed by using the zero insertion processing. Oversampling (interpolation processing) in the interpolation unit 4 can be performed by using other interpolation methods. A method of performing interpolation (oversampling) without changing the input time domain signal to the frequency domain signal once can be used.

An interpolated sample point is added between symbols by the oversampling (interpolation processing) by the interpolation unit 4. In this case, oversampling is performed such that the phase and amplitude of the last sample of the SC block and the first sample (a fixed symbol) of the next SC block are smoothly connected. For example, interpolation is performed by assuming that a fixed symbol point is present subsequent to the last sample point of the SC block, and an interpolated point is added after the last sample point of the SC block. If it is assumed that the oversampling rate is L, the number of samples in an output signal of the interpolation unit 4 becomes (N+$N_{CP}$)×L. In the present embodiment, the "fixed symbol" indicates a symbol with the phase and amplitude being fixed; however, a symbol in a specific quadrant can be used. The processing described above is performed for each of the single-carrier block symbols. The oversampling rate L does not need to be an integer.

As described above, in the present embodiment, the fixed-symbol arrangement unit 2 arranges a fixed symbol at the head position of a region to be copied by the CP insertion unit 3 with respect to data symbols for each block. The CP insertion unit 3 performs CP insertion on the block symbol after the fixed symbol has been inserted. The interpolation unit 4 then performs oversampling on the block symbol after the CP insertion. Thus, continuity of the phase and amplitude between blocks can be maintained; therefore, the out-of-band spectrum can be suppressed.

Second Embodiment

Figure 8:
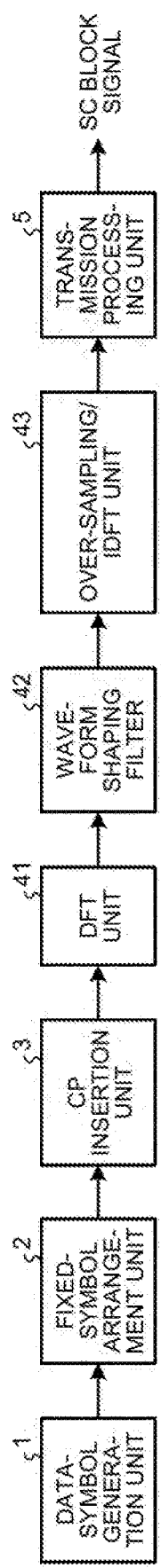
FIG. 8 is a diagram illustrating a functional configuration example of a transmission apparatus according to a second embodiment.

FIG. 8 is a diagram illustrating a functional configuration example of a transmission apparatus according to a second embodiment of the present invention. FIG. 8 illustrates a configuration example of the interpolation unit 4 of the transmission apparatus according to the second embodiment. In the present embodiment, an example in which the interpolation unit 4 in FIG. 1 includes a DFT unit (Fourier transform unit) 41, a waveform shaping filter 42, and an oversampling/IDFT (Inverse DFT) unit (inverse Fourier transform unit) 43 is described. The data-symbol generation unit 1, the fixed-symbol arrangement unit 2, the CP insertion unit 3, and the transmission processing unit 5 are similar to those in the first embodiment. Constituent elements having functions identical to those of the first embodiment are denoted by like reference signs in the first embodiment, and redundant explanations thereof will be omitted.

The DFT unit 41 performs (N+$N_{CP}$)-point DFT processing to convert the input time domain signal to a frequency domain signal. The waveform shaping filter 42 performs filtering processing to remove a signal other than signals in a desired frequency domain on the frequency domain signal. In the filtering processing, processing such as Nyquist filtering described in, for example, "T. S. Rappaport, "Wireless Communications", edition, Prentice Hall PTR, 2002" (hereinafter, "Rappaport Literature") can be used. The filtering processing is not limited thereto.

The oversampling/IDFT unit 43 increases the number of samples to L times by zero insertion or the like with respect to the frequency domain signal having been subjected to the filtering processing (increases the number of samples to the number corresponding to the oversampling rate L). Thereafter, the oversampling/IDFT unit 43 generates a time domain signal by performing the IDFT processing on the frequency domain signal. When the waveform shaping filter 42 does not change the number of samples of the signal, the number of samples to be subjected to the IDFT processing becomes L·(N+$N_{CP}$). Instead of the oversampling/IDFT unit 43, an oversampling unit that performs oversampling and an IDFT unit that performs IDFT processing can be provided. Because the DFT processing and the IDFT processing are performed, for example, by using IFFT (Inverse Fast Fourier Transform) and FFT that require a low computation amount, it is desired that (N+$N_{CP}$) is $2^P$ (P is an integer equal to or larger than 1) and L is an integer. When the waveform shaping filter 42 changes the number of samples of the signal, it is desired that the number of samples being an input of the IDFT processing is $2^{P'}$ (P' is an integer equal to or larger than 1).

If it is assumed that $N_A$ is the total number of carriers, in the present embodiment, $N_A$=N+$N_{CP}$. However, the total number of carriers can be $N_A$>N+$N_{CP}$. In this case, if it is assumed that the waveform shaping filter does not change the number of points, $s_i$(0≤i≤N+$N_{CP}$−1) is an output of the waveform shaping filter, $0_{1,M}$ is a vector established by 1×M zeroes, and $N_A$−N−$N_{CP}$ is an even number, the oversampling/IDFT unit 43 maps $s_1$ in the $N_A$ carriers, as represented by the following equation (1). Further, zero insertion is performed on y to perform oversampling. In this case, the number of output samples of the oversampling/IDFT unit 43 can be $N_A$*L. Mapping to the total carriers can be performed by any processing method.

$$y = [0_{1,(N_A-N-N_{CP})/2}, s_0, s_1, \square, s_{N+N_{CP}-1}, 0_{1,(N_A-N-N_{CP})/2}] \quad (1)$$

Figure 9:
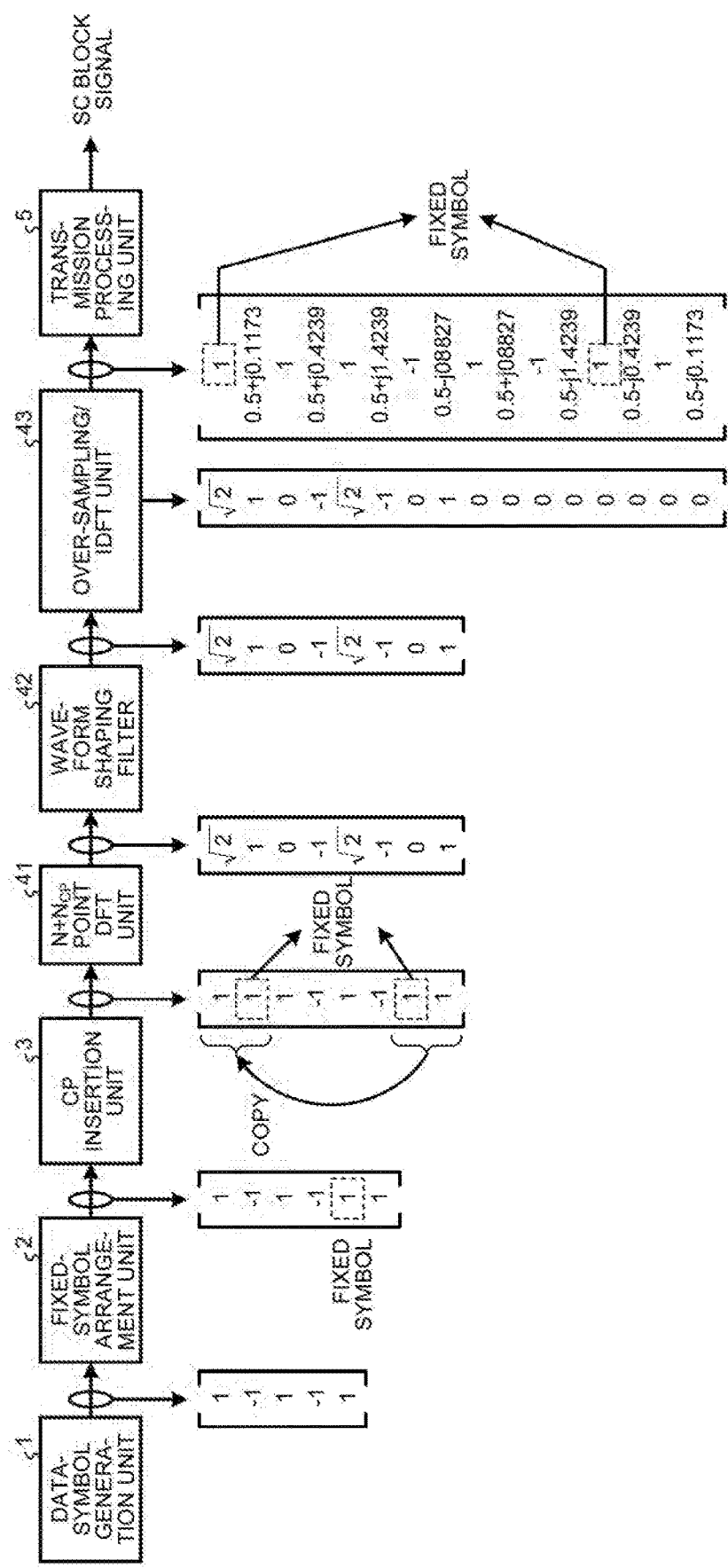
FIG. 9 is a diagram illustrating an example of processed data in the transmission apparatus of the second embodiment.

FIG. 9 is a diagram illustrating an example of processed data in the transmission apparatus of the present embodiment. FIG. 9 illustrates an example in which BPSK (Binary Phase Shift Keying) is used, assuming that L=2, N=6, $N_{CP}$2, and A=1 is arranged in the fifth symbol as a fixed symbol. In the example in FIG. 9, zero insertion is used as the oversampling processing. In FIG. 9, to simplify signage, rounding is performed to four decimal places. As illustrated in FIG. 9, it is understood that by arranging the fixed symbol in the fifth symbol, the fixed symbol is inserted into the first and the thirteenth symbols after the processing by the oversampling/IDFT unit 43, and a symbol to be an interpolated point is added after the last symbol of the symbol group output from the CP insertion unit 3. The zero insertion method in the present embodiment is only an example, and other zero insertion methods can be used, for example, zero insertion is performed after cyclic shift is applied to the signal in the frequency domain.

Figure 10:
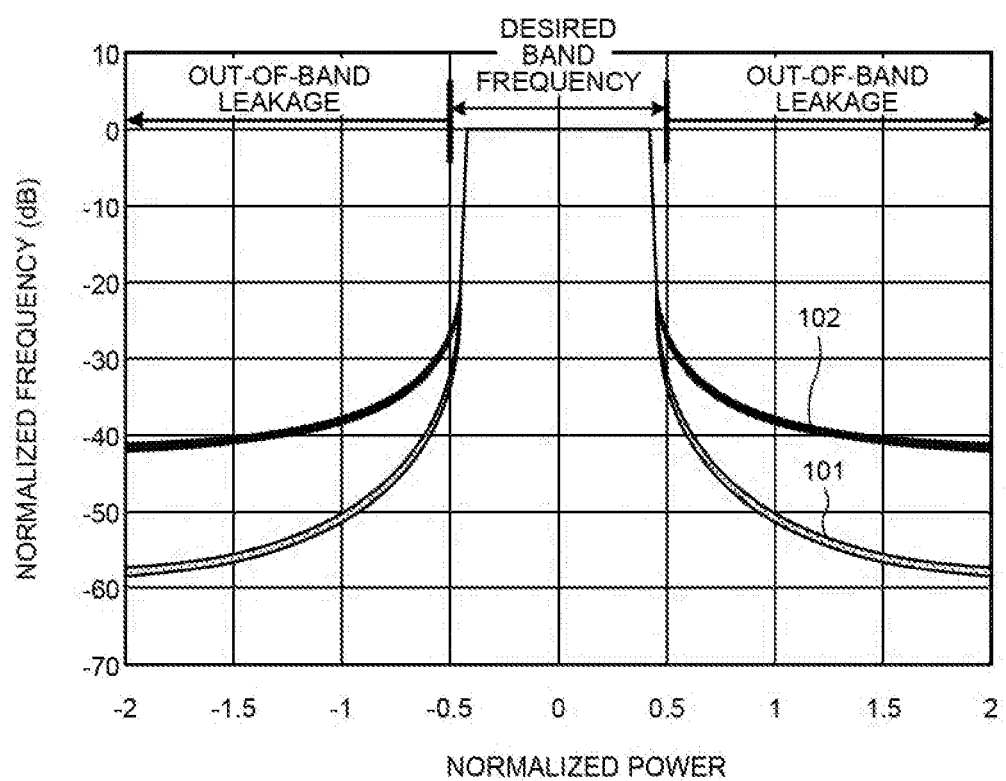
FIG. 10 is an explanatory diagram of an out-of-band leakage suppression effect by the transmission apparatus according to the second embodiment.

FIG. 10 is an explanatory diagram of an out-of-band leakage suppression effect by the transmission apparatus according to the present embodiment. FIG. 10 illustrates a transmission signal 101 when out-of-band leakage suppression using the fixed symbol of the present embodiment is performed and a transmission signal 102 when out-of-band leakage suppression is not performed. In FIG. 10, the desired band frequency is illustrated in the central portion and the region that causes the out-of-band leakage is illustrated on both end sides of the desired band frequency. As illustrated in FIG. 10, it is understood that, in the transmission signal 101 that has been subjected to the out-of-band leakage suppression, the out-of-band leakage decreases by about 16 dB compared to the transmission signal 102 when the out-of-band leakage suppression is not performed. In the present example, it is assumed that $N_A$=512, $N_{CP}$=16, N=434, and the oversampling rate is L=4, a frequency-domain zero roll-off filter described in the Rappaport Literature is used as the waveform shaping filter, and mapping to the carriers in the frequency domain is performed as represented by the following equation (2). The signal y becomes an input value to the oversampling/IDFT unit 43.

$$y = [0_{1,(N_A-N-N_{CP})/2}, S_0, S_1, \square, S_{N+N_{CP}-1}, 0_{1,(N_A-N-N_{CP})/2}] \qquad (2)$$

As described above, according to the present embodiment, after the DFT unit 41 converts the block symbol after CP insertion to a frequency domain signal, the oversampling/IDFT unit 43 performs oversampling and converts the oversampled signal to a time domain signal by the IDFT. Therefore, as described in the first embodiment, the continuity of the phase and amplitude between the blocks can be maintained; therefore, the out-of-band spectrum can be suppressed. In the case of $N_{CP}$=0, the CP insertion unit 3 in FIG. 8 does not perform copying and the fixed-symbol arrangement unit 2 sets $d_0$ (the first symbol in a block) as a fixed symbol.

Third Embodiment

Figure 11:
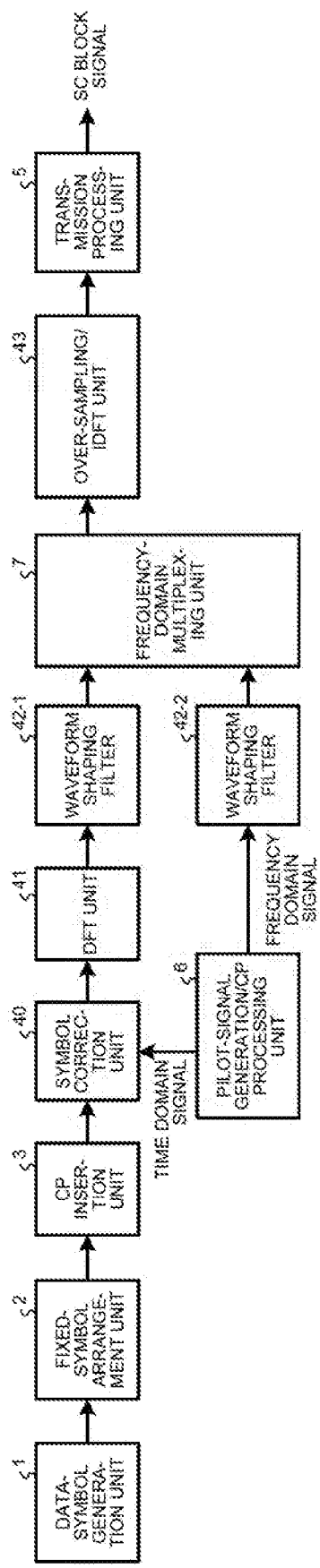
FIG. 11 is a diagram illustrating a functional configuration example of a transmission apparatus according to a third embodiment.

FIG. 11 is a diagram illustrating a functional configuration example of a transmission apparatus according to a third embodiment of the present invention. FIG. 11 illustrates a configuration example of the interpolation unit 4 of the transmission apparatus according to the third embodiment. The transmission apparatus according to the present embodiment includes the data-symbol generation unit 1, the fixed-symbol arrangement unit 2, the CP insertion unit 3, a symbol correction unit 40, the DFT unit 41, waveform shaping filters 42-1 and 42-2, a pilot-signal generation/CP processing unit 6, a frequency-domain multiplexing unit 7, the oversampling/IDFT unit 43, and the transmission processing unit 5. The data-symbol generation unit 1, the fixed-symbol arrangement unit 2, the CP insertion unit 3, the DFT unit 41, the oversampling/IDFT unit 43, and the transmission processing unit 5 are similar to those in the second embodiment. Constituent elements having functions identical to those of the second embodiment are denoted by like reference signs in the second embodiment, and redundant explanations thereof will be omitted.

A pilot signal that is a known signal is used in some cases to perform synchronous processing and estimation of a transmission line on the reception side. In the block transmission, the pilot signal (the pilot symbol) is generally arranged in the frequency domain. In the present embodiment, an example in which the pilot signal is arranged in the frequency domain is described.

The pilot-signal generation/CP processing unit 6 generates a time-domain pilot signal and a frequency-domain pilot signal, inputs the frequency-domain pilot signal to the waveform shaping filter 42-2, and inputs the time-domain pilot signal to the symbol correction unit 40. The pilot-signal generation/CP processing unit 6 can apply CP processing (P insertion processing) to the time-domain pilot signal. Further, the pilot-signal generation/CP processing unit 6 can perform normalization on the pilot signals. For example, if it is assumed that the time domain signals of the pilot signals are $q_0, q_1, \ldots, q_{N-1}$, and $N_{CP}$ is the CP length, the pilot signals become $q_{N-NCP}, \ldots, q_{N-1}, q_1, q_0, q_1, \ldots, q_{N-1}$ ($N_{CP}$ is written as NCP in the index) after the CP processing. When the CP processing is to be added, the pilot-signal generation/CP processing unit 6 generates, as the frequency-domain pilot signal, a signal by performing the DFT processing on the signal obtained by inserting the CP into the time domain signal of the pilot signal.

The frequency-domain pilot signal is used for multiplexing and the time-domain pilot signal is used for calculation of a fixed symbol. The frequency-domain multiplexing unit 7 multiplexes a data symbol that is input via the waveform shaping filter 42-1 and is converted to a frequency domain signal by the DFT unit 41 and a frequency-domain pilot signal (pilot symbol) input via the waveform shaping filter 42-2 in the frequency domain. The waveform shaping filters 42-1 and 42-2 are similar to the waveform shaping filter 42 according to the second embodiment. The waveform shaping filter 42-1 performs waveform shaping in the frequency domain on the output from the DFT unit 41, and the waveform shaping filter 42-2 performs waveform shaping on the pilot symbol in the frequency domain. The pilot signal is not particularly limited, and any signal can be used. The time-domain pilot signal is generated on the basis of the arrangement position of the pilot signal in the frequency domain.

Figure 12:
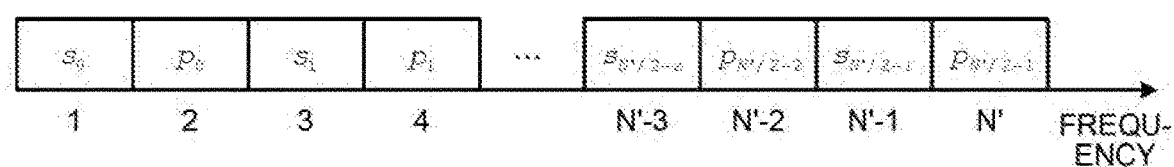
FIG. 12 is a diagram illustrating an example of arrangement of pilot symbols in a frequency domain.

FIG. 12 is a diagram illustrating an example of arrangement of pilot symbols in the frequency domain. FIG. 12 illustrates an example in which the total number of symbols (after CP insertion) in one block is N' (=N+2$N_{CP}$), the number of pilot symbols $N_P$ in one block is N'/2, and the number of data symbols including fixed symbols in one block is N'/2. In the example of FIG. 12, there are alternate arrangements of the pilot symbols $p_0, p_1, \ldots, p_{N'/2-1}$ in the frequency domain and the data symbols including fixed symbols $s_0, s_1, \ldots, s_{N'/2-1}$. FIG. 12 is only an example, and there is no limitation on the arrangement of the pilot symbols and the number of the pilot symbols in the block symbol.

Because the pilot symbols and the data symbols including the fixed symbols are multiplexed in the frequency domain by the frequency-domain multiplexing unit 7, in order to set the fixed symbol as "A" in the time domain signal that is the IDFT output (the output from the oversampling/IDFT unit 43), the time-domain pilot signals need to be taken into consideration. When it is assumed that the time domain signals of the pilot signals are $q_0, q_1, q_2, \ldots, q_{N'/2-1}$, $k'$ is a fixed symbol insertion position in the time domain, and $b_{k'}$ and $c_{k'}$ are phase rotation and amplitude adjustment performed such that the symbol at the predetermined position in the IDFT output becomes "A", the symbol correction unit 40 obtains a fixed symbol $A_{k'}$, which is a corrected value of the fixed symbol "A" generated by the fixed-symbol arrangement unit 2, as $A_{k'} = c_{k'} A - b_{k'} q_{k'}$. The values of $b_{k'}$ and $c_{k'}$ are determined by the insertion positions of the pilot signals and the arrangement positions of the fixed symbols in the frequency domain.

A specific example is described below. To simplify the description, a signal that has not been subjected to oversampling is used here. It is assumed that the number of data symbols after CP insertion is $N_D = N'/2$ and the number of pilot symbols is $N_T = N'/2$. In the present example, it is assumed that the CP-inserted data symbols are $x_0, x_1, \ldots, x_{ND-1}$ and the pilot symbol $p_z$ arranged in the frequency domain is represented by the following equation (3). The pilot symbol q in the time domain after the IDFT processing becomes as represented by the following equation (4).

$$p_z = [0, p_0, 0, p_1, 0, \square, 0, p_{N_T-1}]^T \qquad (3)$$

$$q = [q_1^T, -q_1^T]^T \qquad (4)$$

If it is assumed that the DFT-processed data signals ($x_0, x_1, \ldots, x_{ND-1}$), which are arranged in the frequency domain, are represented by the following equation (5), and a constant b is a normalization constant, the data signal t in the time domain after the IDFT processing becomes as represented by the following equation (6).

$$s_z = [s_0, 0, s_1, 0, s_2, 0, \square, 0, s_{N_D-1}, 0]^T \qquad (5)$$

$$t = b[t_1^T, t_2^T]^T \qquad (6)$$

The pilot signal and the DFT-processed data signal multiplexed in the frequency domain become as represented by the following equation (7), and the time domain signal after the IDFT processing becomes as represented by the following equation (8).

$$r = p_z + s_z \qquad (7)$$

$$y = t + q \qquad (8)$$

In the time domain, when it is assumed that $t_{1,0}$ is the first element of $t_1$, $t_{1,n} = x_n$. Therefore, when it is desired to set the fixed signal "A" as $y_0 = A$ in a symbol time n=0, it suffices that a symbol as represented by the following equation (9) is inserted into the data symbol. In the present example, to simplify the description, description of the normalization constant and phase rotation is omitted. Phase rotation and amplitude adjustment need to be performed in the equation (9), according to the symbol arrangement in the frequency domain.

$$x_0 - A_0' = \frac{1}{b}(A - q_{1,0}) \qquad (9)$$

Figure 13:
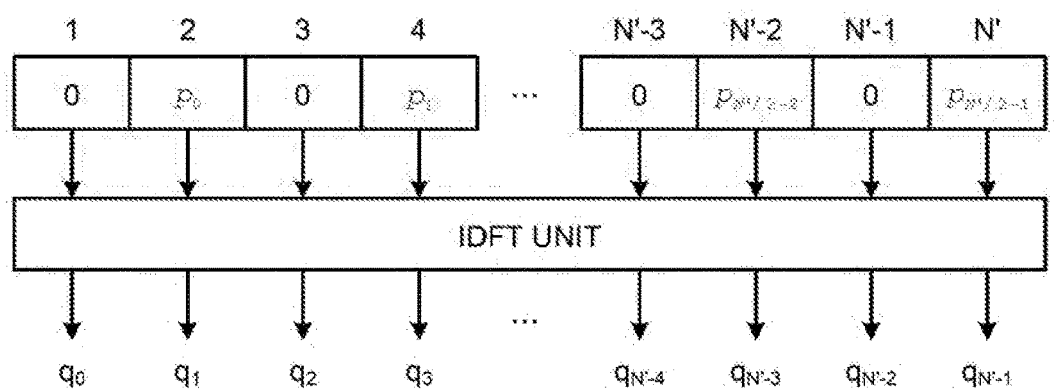
FIG. 13 is a diagram illustrating an example of a relation between a time-domain pilot signal and a frequency-domain pilot signal.

FIG. 13 is a diagram illustrating an example of a relation between the time-domain pilot signals and the frequency-domain pilot signals. In FIG. 13, the arrangement of the data symbols and the pilot symbols in the frequency illustrated in FIG. 12 is presupposed. As illustrated in FIG. 13, in the frequency arrangement illustrated in FIG. 12, the IDFT processing is performed by designating a signal in which the portions of the data symbols (including the fixed symbols) are replaced by 0 as an input of the IDFT processing, to obtain the time-domain pilot signals. In FIG. 13, to simplify the description, time-domain pilot signals that are not subjected to oversampling are illustrated. However, it is possible to use pilot signals having been subjected to oversampling, for example, zero insertion, in the frequency domain.

Figure 14:
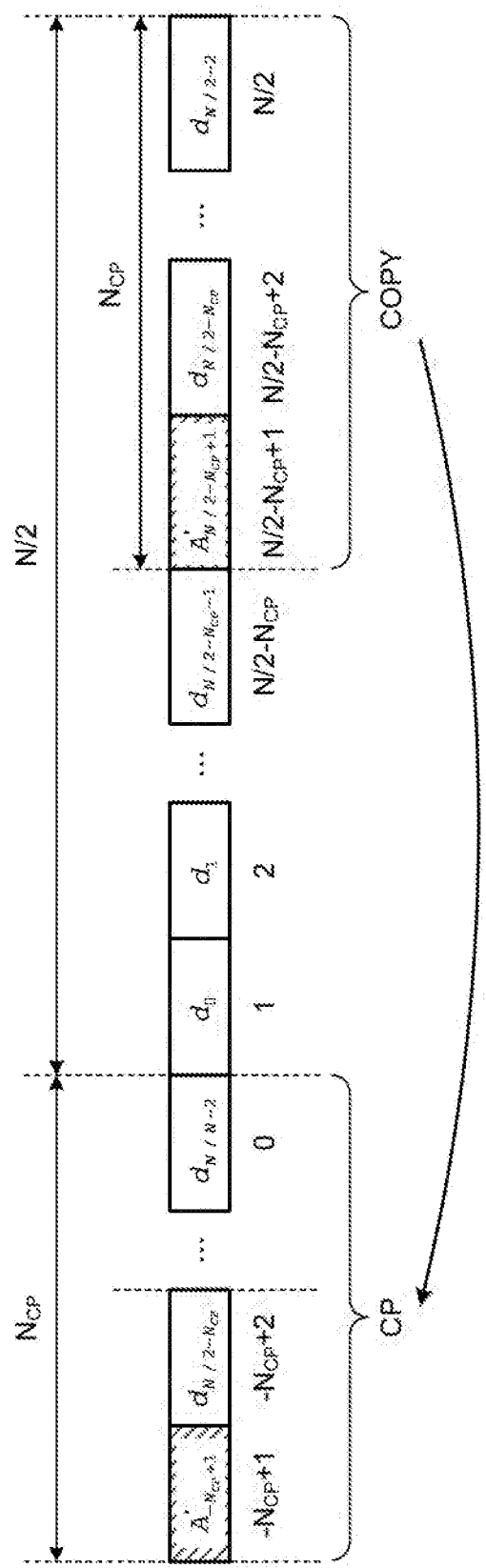
FIG. 14 is a diagram illustrating an example of symbol arrangement of the present embodiment after correction by a symbol correction unit.

In the present embodiment, because the pilot symbols are inserted in the frequency domain, the value of the fixed symbol changes according to the insertion position of the pilot signals and the fixed symbol. Therefore, the processing described above is performed for each block. However, if the insertion positions of the pilot signals and the fixed symbol are fixed between the blocks, it is possible to obtain $A_k'$ once and thereafter use $A_k'$ that is already obtained. FIG. 14 is a diagram illustrating an example of symbol arrangement of the present embodiment after correction by the symbol correction unit 40. In FIG. 14, it is assumed that the total number of symbols before the CP insertion in one block is N and the number of pilot symbols $N_p$ in one block is N'/2. To maintain the continuity of the phase and amplitude between blocks, phase rotation and amplitude adjustment can be applied to the fixed symbol or a fixed signal can be added. Further, in FIG. 14, it is described that the ($-N_{CP}+1$)th symbol and (N/2$-N_{CP}+1$)th symbol are adjusted; however, only the ($-N_{CP}+1$)th symbol can be adjusted.

Figure 15:
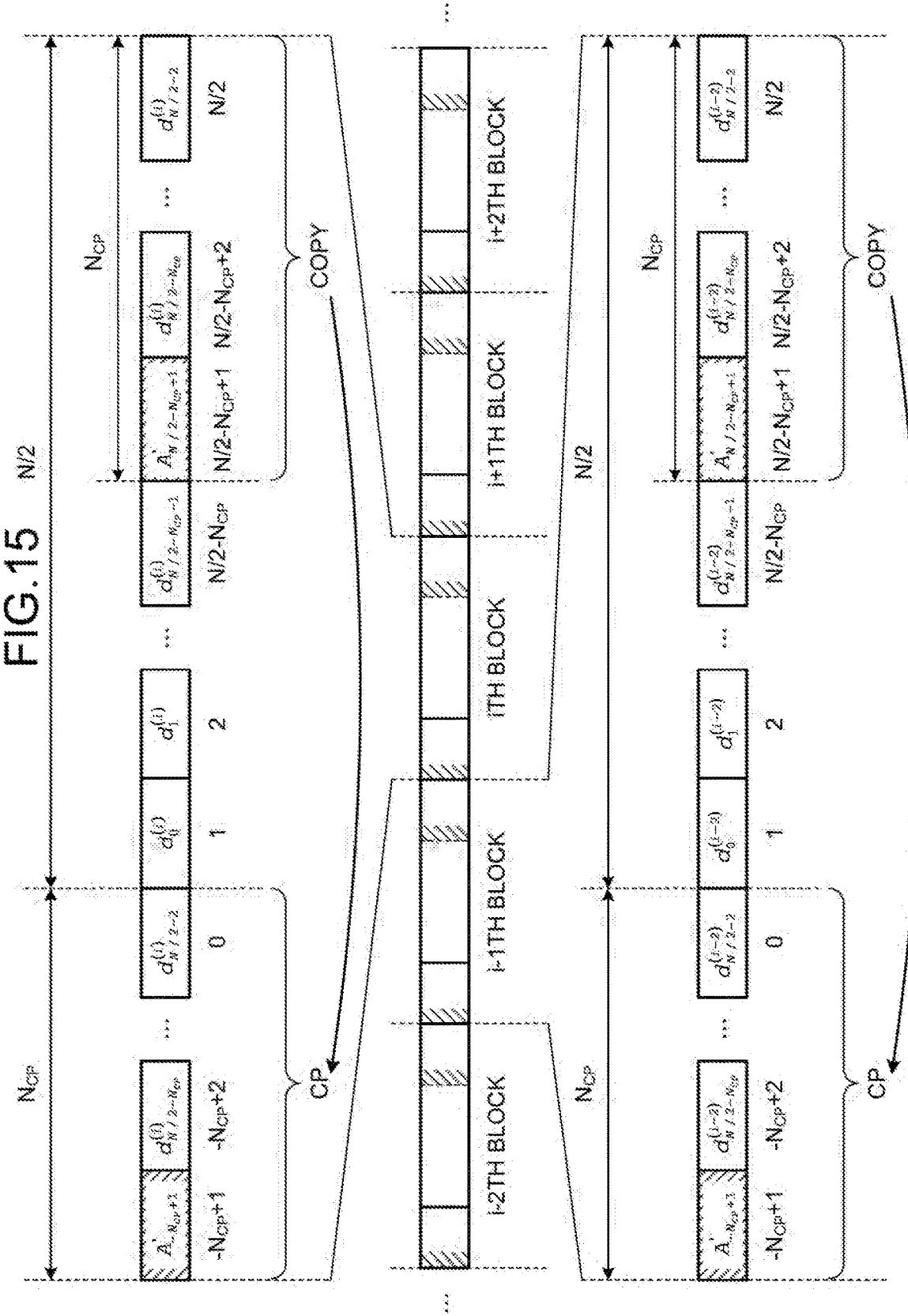
FIG. 15 is a diagram illustrating an example of the frame configuration of the third embodiment when a pilot symbol is inserted into ail blocks in a frame.

FIG. 15 is a diagram illustrating an example of the frame configuration of the present embodiment (the fixed symbols and the data symbols after the correction by the symbol correction unit 40) when pilot symbols are inserted into all the blocks in a frame. As illustrated in FIG. 15, the corrected fixed symbols are inserted such that the insertion positions of the fixed symbols become the same in the respective blocks.

Figure 16:
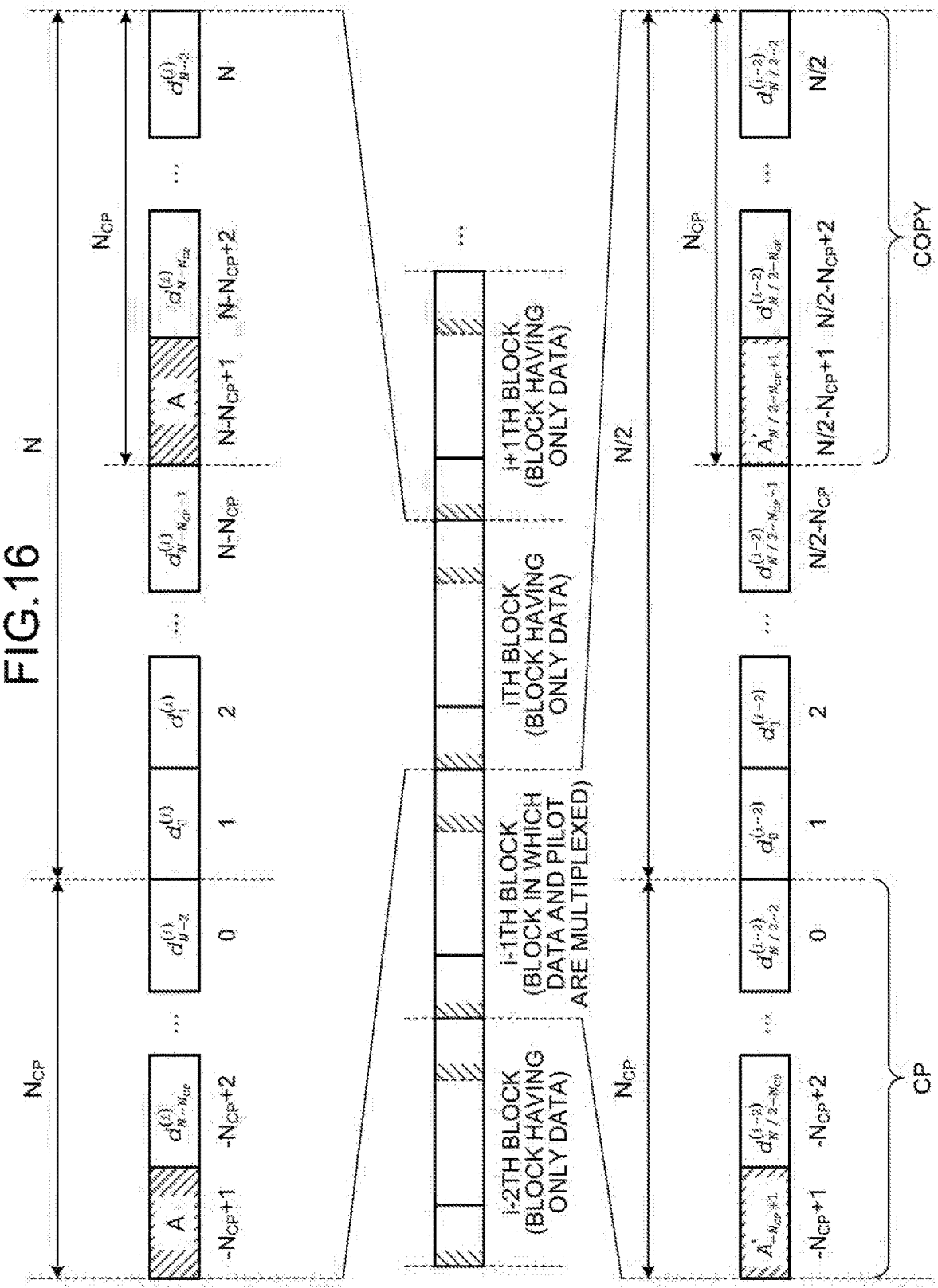
FIG. 16 is a diagram illustrating an example of the frame configuration including both a block in which a pilot symbol is inserted and a block in which a pilot symbol is not inserted.

The first embodiment is an embodiment in which a block symbol consists of only data symbols, and the second embodiment is an embodiment in which a block symbol consists of pilot symbols and data symbols. If a fixed symbol is set in the time domain such that the fixed symbol is arranged at the same position in each block, the frame configuration combining the two embodiments can be used. Also in this case, an effect of suppressing the out-of-band spectrum can be acquired. FIG. 16 is a diagram illustrating an example of the frame configuration including both a block in which a pilot symbol is inserted and a block in which a pilot symbol is not inserted. In FIG. 16, in the i-th block, a pilot symbol is not inserted; therefore, the processing similar to that of the first embodiment is performed, and in the (i-1)th block, a pilot symbol is inserted; therefore, the processing similar to that of the second embodiment is performed.

As described above, according to the present embodiment, when the pilot symbol is multiplexed in the frequency domain and transmitted, the symbol correction unit 40 corrects the fixed symbol such that the IDFT-processed fixed symbol after being multiplexed with the pilot signal has a predetermined value at a predetermined position, on the basis of the arrangement position of the pilot signal. Accordingly, even if the pilot signal is multiplexed, the continuity of the phase and amplitude between blocks can be maintained; therefore, the out-of-band spectrum can be suppressed. Also in the present embodiment, in the case of $N_{CP}=0$, the first data symbol in a block can be set as a fixed symbol, and symbol correction can be performed by using a pilot symbol in the time domain.

Fourth Embodiment

Figure 17:
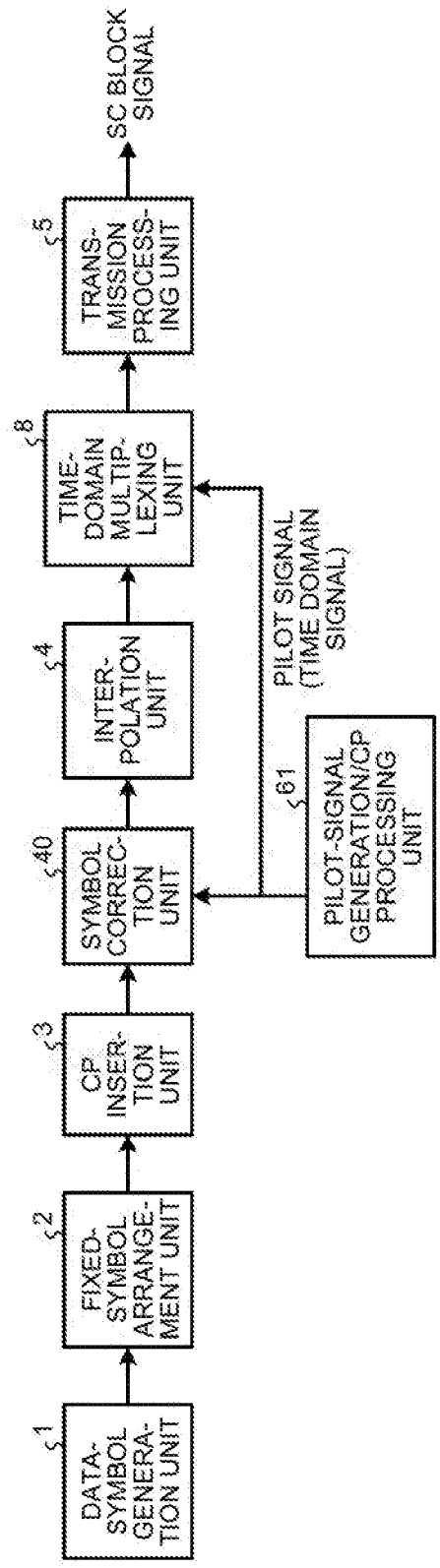
FIG. 17 is a diagram illustrating a functional configuration example of a transmission apparatus according to a fourth embodiment.

FIG. 17 is a diagram illustrating a functional configuration example of a transmission apparatus according to a fourth embodiment of the present invention. The transmission apparatus according to the present embodiment includes the data-symbol generation unit 1, and the fixed-symbol arrangement unit 2, the CP insertion unit 3, the symbol correction unit 40, the interpolation unit 4, a pilot-signal generation/CP processing unit 61, a time-domain multiplexing unit 8, and the transmission processing unit 5. The data-symbol generation unit 1, the fixed-symbol arrangement unit 2, the CP insertion unit 3, the interpolation unit 4, and the transmission processing unit 5 are similar to those in the first embodiment. The symbol correction unit 40 is similar to that in the second embodiment. Constituent elements having functions identical to those of the first or second embodiment are denoted by like reference signs in the first or second embodiment, and redundant explanations thereof will be omitted.

In the third embodiment, an example in which the pilot signals are multiplexed in the frequency domain has been described. In the present embodiment, the pilot signals are multiplexed in the time domain. The pilot-signal generation/CP processing unit 61 generates time-domain pilot signals and inputs the pilot signals to the time-domain multiplexing unit 3 and the symbol correction unit 40. The interpolation unit 4 generates time-domain data symbols (including a fixed symbol) as in the first embodiment, and the time-domain multiplexing unit 8 multiplexes the time-domain data symbols (including a fixed symbol) and the time-domain pilot signals in the time domain. The time-domain multiplexing can be performed as $y_k=s_k+p_k$, for example, assuming that $s_k$ is a data signal in the time domain, $p_k$ is a pilot signal in the time domain, and the multiplexed signal is $y_k$.

As described above, according to the present embodiment, when the pilot symbols are multiplexed in the time domain and transmitted, the symbol correction unit 40 corrects the fixed symbol. Accordingly, even if the pilot signals are multiplexed in the time domain, the continuity of the phase and amplitude between blocks can be maintained; therefore, the out-of-band spectrum can be suppressed.

Fifth Embodiment

Figure 18:
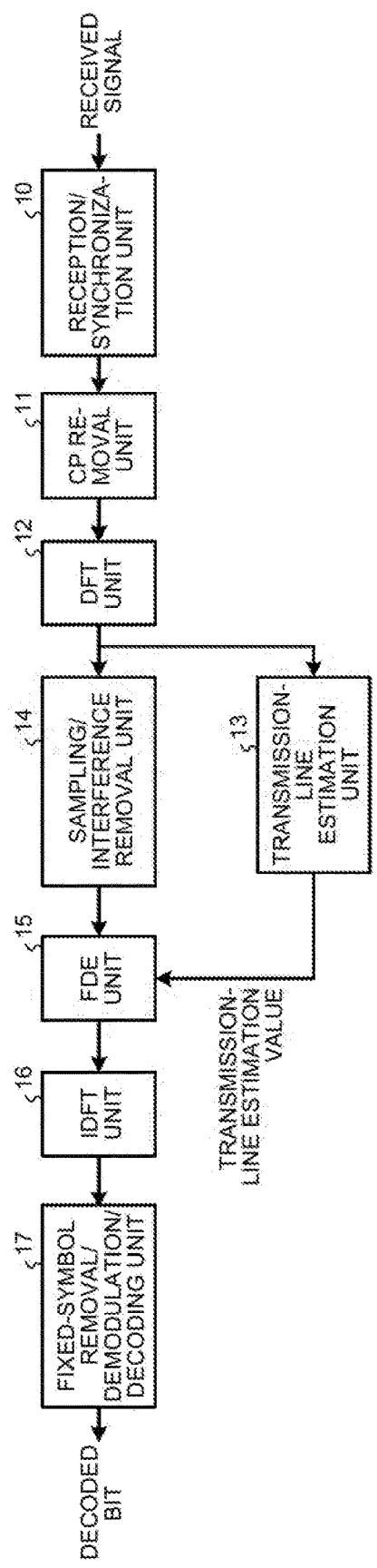
FIG. 18 is a diagram illustrating a functional configuration example of a reception apparatus according to a fifth embodiment.

FIG. 18 is a diagram illustrating a functional configuration example of a reception apparatus according to a fifth embodiment of the present invention. The reception apparatus according to the present embodiment receives an SC block signal transmitted by the transmission apparatus described in the first to fourth embodiments.

The reception apparatus according to the present embodiment is such that a reception/synchronization unit 10 performs synchronous processing such as frame synchronization, frequency synchronization, and symbol synchronization on a received signal (an SC block signal). A CP removal unit 11 performs CP removal on the received signal after the synchronous processing. A DFT unit 12 performs DFT processing on the CP-removed received signal. A transmission-line estimation unit 13 performs estimation of a transmission line in accordance with the DFT-processed signal. A sampling/interference removal unit 14 performs downsampling on the DFT-processed signal. An FDE unit (equalization unit) 15 performs FDE (Frequency Domain Equalizer: frequency domain equalization) processing on the basis of the downsampled signal and the estimation result of the transmission line. An IDFT unit 16 performs IDFT processing on the FDE-processed signal. A fixed-symbol removal/demodulation/decoding unit 17 removes a fixed symbol from the IDFT-processed signal and performs demodulation and decoding processing on the signal after the fixed symbol has been removed. In the configuration example of FIG. 18, the fixed-symbol removal/demodulation/decoding unit 17 performs removal, demodulation, and decoding of the fixed symbol. However, a fixed-symbol removal unit that removes a fixed symbol and a demodulation/decoding unit that performs demodulation and decoding can be separately provided.

As described in the first to third embodiments, on the transmission side, oversampling is performed on the DFT-processed signal including the CP, and thus the CP component is in a data area. Therefore, CP interference removal is performed on the reception side as required. For example, the synchronization unit 10 can estimate the value of the CP symbol and the interference value. Therefore, the synchronization unit 10 can provide the CP estimation value to the sampling/interference removal unit 14 to remove CP interference. Further, the transmission-line estimation unit 13 can perform CP estimation.

As described above, in the present embodiment, the reception apparatus that receives the SC block signal transmitted by the transmission apparatus described in the first to third embodiments has been described. The reception apparatus performs demodulation and decoding on the received signal after downsampling and removal of the fixed symbol have been performed. Accordingly, it is possible to perform demodulation and decoding processing on the signal that is transmitted after the fixed symbol is inserted thereinto and interpolation processing is performed thereon.

Sixth Embodiment

Figure 19:
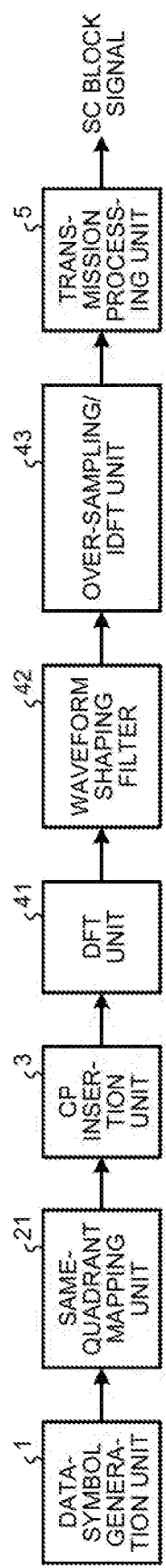
FIG. 19 is a diagram illustrating a functional configuration example of a transmission apparatus according to a sixth embodiment.

FIG. 19 is a diagram illustrating a functional configuration example of a transmission apparatus according to a sixth embodiment of the present invention. The transmission apparatus according to the present embodiment includes the data-symbol generation unit 1, a same-quadrant mapping unit 21, the CP insertion unit 3, the DFT unit 41, the waveform shaping filter 42, the oversampling/IDFT unit 43, and the transmission processing unit 5. The data-symbol generation unit 1, the CP insertion unit 3, the DFT unit 41, the waveform shaping filter 42, the oversampling/IDFT unit 43, and the transmission processing unit 5 are similar to those as in the second embodiment. Constituent elements having functions identical to those of the second embodiment are denoted by like reference signs in the second embodiment, and redundant explanations thereof will be omitted.

In the first to fourth embodiments, an example in which a fixed symbol is arranged at a predetermined position has been described. In the present embodiment, a symbol that becomes a signal point in the same quadrant (hereinafter, "same-quadrant symbol") is arranged at a predetermined position in a complex plane (an IQ plane) instead of the fixed symbol.

Figure 20:
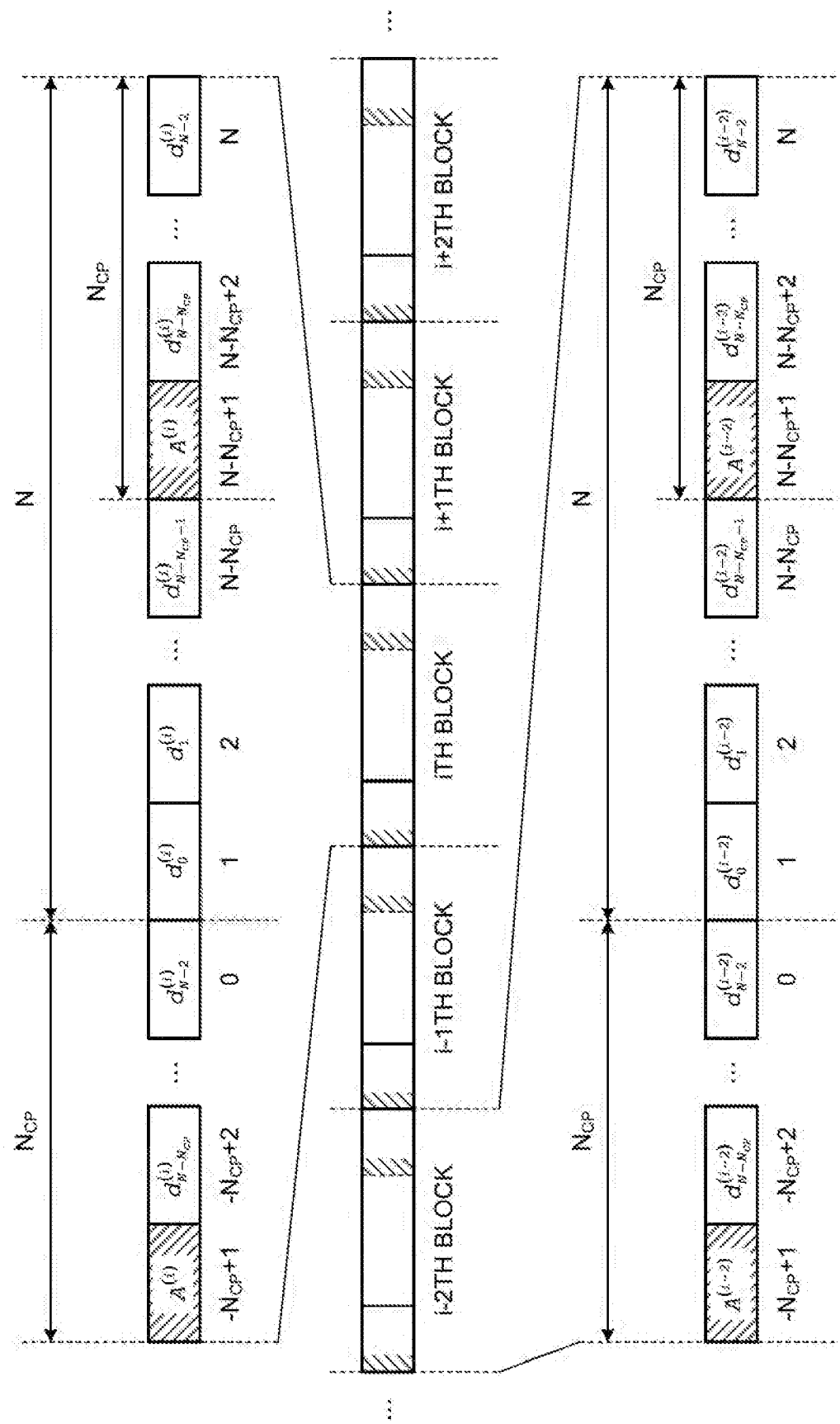
FIG. 20 is a diagram illustrating an example of symbol arrangement of the sixth embodiment.

The same-quadrant mapping unit 21 performs mapping such that a symbol at a predetermined position in a block becomes the same-quadrant symbol in the time domain. FIG. 20 is a diagram illustrating an example of symbol arrangement of the present embodiment. A symbol $A^{(i)}$ denotes a same-quadrant symbol in the i-th block. For example, $A^{(i-1)}$ and $A^{(i)}$ are not always the same symbol, but are mapped in the same quadrant. In this manner, by using the same-quadrant symbols instead of the fixed symbols that have the same value, the same-quadrant symbol can include data bits, thereby enabling data loss to be minimized.

Figure 21:
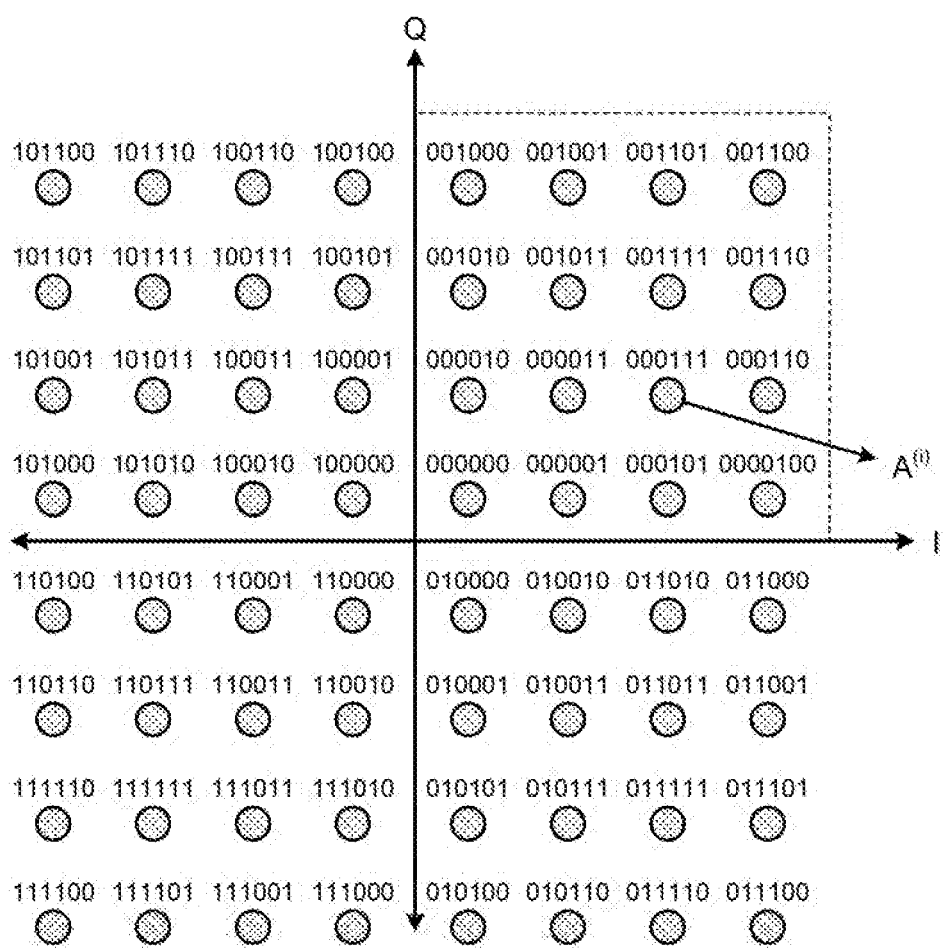
FIG. 21 is a diagram illustrating 64 QAM constellation and a mapping area of same-quadrant symbols.

FIG. 21 is a diagram illustrating 64 QAM constellation and a mapping area of the same-quadrant symbols. When 64 QAM symbols are used as the data symbols, the same-quadrant symbol is mapped at a point, for example, in the upper right quadrant (an area surrounded by a dotted line in FIG. 21). In the case of FIG. 21, it suffices that the symbol $A^{(i)}$, which is the same-quadrant symbol in the i-th block, is arranged in the area indicated by the dotted line. Therefore, high-order two bits of the same-quadrant symbol are fixed to "00" and the remaining low-order four bits can be used as data bits. The high-order two bits of the same-quadrant symbol arranged at a predetermined position in the time domain are fixed to "00" for all the blocks, and the low-order four bits take arbitrary values. In the example of FIG. 21, the mapping area of the same-quadrant symbol is assumed to be in one quadrant; however, the same-quadrant symbol can be mapped in a narrower area in the same quadrant.

Even if the pilot symbol is inserted, as in the second embodiment, if it is assumed that $A_{k'}^{(i)}$ is the same-quadrant symbol and k' is an insertion position, it suffices that the same-quadrant symbol is corrected such that the IDFT output becomes $A^{(i)}$, assuming that $A_{k'}^{(i)}=c_{k'}A^{(i)}-b_{k'}q_{k'}$, while taking the pilot component into consideration.

FIGS. 22 and 23 are diagrams illustrating examples of a block symbol when 64 QAM is used. FIG. 22 illustrates an example in which the $(N-N_{CP}+1)$th symbol is set as the same-quadrant symbol, high-order two bits of the same-quadrant symbol are fixed to "01", and the same processing is applied to all the blocks. FIG. 23 illustrates an example in which the $(N-N_{CP}+1)$th symbol is set as the same-quadrant symbol, high-order four bits of the same-quadrant symbol are fixed to "0100", and the same processing is applied to all the blocks. In the example of FIG. 22, the number of data bits per block symbol becomes 6N-2 bits, and in the example of FIG. 23, the number of data bits per block symbol becomes 6N-4 bits.

In the present embodiment, a configuration example in which interpolation using DFT is performed has been described. However, as described in the first embodiment, the same-quadrant symbol can be used instead of the fixed symbol also in the configuration example in which the interpolation unit 4 is used. Further, the reception apparatus that receives the signal transmitted from the transmission apparatus according to the present embodiment performs removal of the fixed bits of the same-quadrant symbol instead of removal of the fixed symbol, and handles the remaining bits after removal of the fixed bits as data bits to perform the decoding processing, in the fixed-symbol removal/demodulation/decoding unit 17 of the reception apparatus described in the fifth embodiment.

As described above, according to the present embodiment, the same-quadrant symbol is arranged instead of the fixed symbol. Therefore, data loss can be reduced as compared to the case of using the fixed symbol.

Furthermore, in the present embodiment, an example of performing block transmission has been described. However, the present invention is not limited thereto, and can be applied to a transmission apparatus and a reception apparatus of various systems including a wired system. Further, generation of the fixed symbol and the same-quadrant symbol has been described. However, generation of these symbols is not limited to the examples described above, and for example, a plurality of methods can be combined. The configurations of the transmission apparatus and the reception apparatus are not limited to the apparatus configurations described in the respective embodiments. As the interpolation method and the transmission processing method used for oversampling and the like described in the present embodiment, any method can be used as long as the continuity between the first and the last samples can be maintained in the SC block symbol.

Seventh Embodiment

The transmission apparatus according to a seventh embodiment is described next. FIG. 5 of the first embodiment illustrates an example of $N_{CP}>0$. In the present embodiment, as an expansion of $N_{CP}=0$, a method of arranging fixed symbols for suppressing the out-of-band spectrum is described.

Figure 24:
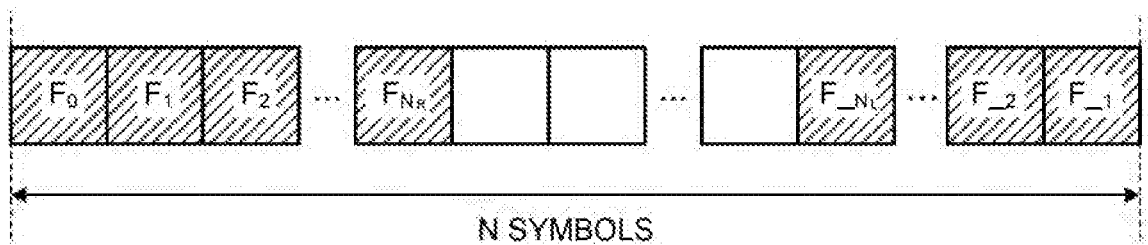
FIG. 24 is a diagram illustrating an arrangement example of fixed symbols according to a seventh embodiment.

FIG. 24 is a diagram illustrating an arrangement example of fixed symbols according to the present embodiment. In the example of FIG. 24, in the case of $N_{CP}=0$, to improve the effect of suppressing the out-of-band spectrum, a fixed symbol is inserted around the first symbol and around the last symbol in a block. In FIG. 24, a blank portion where no character is written indicates a data symbol and E denotes a fixed symbol. In the present embodiment, it is assumed that $N_L+N_R+1$ symbols of the N symbols in one block are fixed symbols. $N_R$ denotes the number of fixed symbols continuous to the right side from the first symbol and $N_L$ denotes the number of fixed symbols continuous to the left side from the last symbol. In the present embodiment, the $N_L+N_R+1$ symbols are referred to as a "fixed symbol series". As illustrated in FIG. 24, the fixed symbol series is expressed as $[F_{-NL}, F_{-NL+1}, F_{-NL+2}, \ldots, F_{-1}, F_0, F_1, \ldots, F_{NR}]$. The subscripts NL and NR respectively denote $N_L$ and $N_P$. There is no limitation on the values of the respective symbols $F_i$ in the fixed symbol series, and two or more of $F_i$ can have the same value. If power normalization is to be performed after arrangement of the fixed symbol series in the block symbol, $F_i$ can be set to different values, respectively. For example, as $F_i$, a symbol such as M-PSK (M-ary-Phase Shift Keying) and M-QAM (M-ary Quadrature Amplitude Modulation) can be used, or several of $F_i$ can be set to zero. Further, the series described in "D. C. Chu, "Polyphase Codes With Good Periodic Correlation Properties", IEEE Transactions on Information Theory, pp. 531-532, July 1972" can be used as the fixed symbol series.

To obtain the spectrum suppression effect, the same fixed symbol series is used in all the blocks, and the same fixed symbols are arranged at the same positions between the blocks. The method of arranging the fixed symbol series is as described below. $F_0$ of the fixed symbol series is arranged at the first position in the block. With reference to these positions, the fixed symbols are arranged on the right and left of the reference position in the order of $[F_{-NL}, F_{-NL+1}, F_{-NL+2}, \ldots, F_{-1}, F_0, F_1, \ldots, F_{NR}]$ such that the relative sequence of the fixed symbol series is not changed. Specifically, the fixed symbol series is divided into a symbol group (a first symbol group) on the left side of the reference position (the position of $F_0$) and a symbol group including the reference position and on the right side of the reference position $[F_0, F_1, \ldots, F_{NR}]$ (a second symbol group). $[F_0, F_1, \ldots, F_{NR}]$ are arranged in order from the first position in the block. Further, because $N_{CP}=0$, the last symbol of the previous block is arranged before the first symbol of each block. Therefore, by arranging $[F_{-NL}, F_{-NL+1}, F_{-NL+2}, \ldots, F_{-1}]$ in the last portion of each block, these symbols $([F_{-NL}, F_{-NL+1}, F_{-NL+2}, \ldots, F_{-1}])$ are arranged on the left side of the reference position (the first symbol).

When the interpolation processing is performed as in the first embodiment, an interpolated sample point is added between symbols. However, due to circularity of the IDFT output, the interpolated point added behind the last symbol becomes a point that interpolates between the last symbol $F_{-1}$ and the first symbol $F_n$. Accordingly, the continuity of the phase and amplitude between blocks can be maintained; therefore, the out-of-band spectrum can be suppressed. Further, by increasing $N_L$ and $N_R$, an effect of further suppressing the out-of-band spectrum can be acquired.

In the present embodiment, the fixed symbol series becomes the same between the blocks. However, the present embodiment can be configured such that the fixed symbol series becomes the same-quadrant symbol between the blocks as described in the sixth embodiment. As a specific example, for example, in the case where the 64 QAM signal as illustrated in FIG. 21 is used, if the first (high-order) bits of a symbol having the symbol number N are fixed to "00", the first two bits of a symbol having the symbol number 1 are fixed to "01", and the first two bits of a symbol having the symbol number 2 are fixed to "11", it is possible to use 4×3=12 bits in total as data bits. As described in the third and fourth embodiments, when the pilot symbols are multiplexed, the fixed symbol series of the present embodiment can be used.

As described above, according to the present embodiment, with reference to the position of the first symbol of the block symbol, the same fixed symbol series is arranged in each block before and after the reference position. Accordingly, the continuity of the phase and amplitude between blocks can be maintained; therefore, the out-of-band spectrum can be suppressed.

INDUSTRIAL APPLICABILITY

As explained above, the transmission apparatus, the reception apparatus, and the communication system according to the present invention are useful in a communication system that performs SC block transmission.

REFERENCE SIGNS LIST

1 data-symbol generation unit, 2 fixed-symbol arrangement unit, 3 CP insertion unit, 4 interpolation unit, 5 transmission processing unit, 6, 61 pilot-signal generation/CP processing unit, 7 frequency-domain multiplexing unit, 8 time-domain multiplexing unit, 21 same-quadrant mapping unit, 40 symbol correction unit, 41 DFT unit, 42, 42-1, 42-2 waveform shaping filter, 43 oversampling/IDFT unit, 10 reception/synchronization unit, 11 CP removal unit, 12 DFT unit, 13 transmission-line estimation unit, 14 sampling/interference removal unit, 15 FDE unit, 16 IDFT unit, 17 fixed-symbol removal/demodulation/decoding unit.

The invention claimed is:

1. A transmission apparatus that transmits a block signal including a plurality of data symbols, the transmission apparatus comprising:
  a first converting circuit that converts a block symbol into a frequency domain signal, the block symbol including the plurality of data symbols arranged therein and including fixed symbols arranged therein; and
  a second converting circuit that performs a mapping processing on the frequency domain signal converted from the block symbol, and converts the frequency domain signal mapped by the mapping processing into a time domain signal,
  wherein the block symbol is constituted such that the fixed symbols that are arranged therein are arranged at a position of a plurality of continuous-arranged symbols including a head of symbols in the block symbol and at a position of a plurality of continuously-arranged symbols including the last symbol in the block symbol.

2. A method implemented using a transmission apparatus that transmits a block signal including a plurality of data symbols, the transmission apparatus including a first converting circuit and a second converting circuit, comprising:
  converting, using the first converting circuit, a block symbol into a frequency domain signal, the block symbol including the plurality of data symbols arranged therein and including fixed symbols arranged therein;
  performing, using the second converting circuit, a mapping processing on the frequency domain signal converted from the block symbol; and
  converting, using the second converting circuit, the frequency domain signal mapped by the mapping processing into a time domain signal,
  wherein the block symbol is constituted such that the fixed symbols that are arranged therein are arranged at a position of a plurality of continuous-arranged symbols including a head of symbols in the block symbol and at a position of a plurality of continuously-arranged symbols including the last symbol in the block symbol.

* * * * *